US006741160B1

(12) United States Patent
Dawson et al.

(10) Patent No.: US 6,741,160 B1
(45) Date of Patent: May 25, 2004

(54) HIGH SECURITY ELECTRONIC COMBINATION LOCK

(75) Inventors: Gerald L. Dawson, New Port Richey, FL (US); Daniel L. Thompson, Paris, KY (US); Lee Stallard, Lexington, KY (US)

(73) Assignee: Kaba-Mas Corporation, Lexington, KY (US)

( * ) Notice: Subject to any disclaimer, the term of this patent is extended or adjusted under 35 U.S.C. 154(b) by 0 days.

(21) Appl. No.: 09/419,948

(22) Filed: Oct. 18, 1999

Related U.S. Application Data

(60) Provisional application No. 60/104,955, filed on Oct. 20, 1998.

(51) Int. Cl.$^{7}$ ............................ H04Q 1/00; E05B 49/00

(52) U.S. Cl. .................... 340/5.55; 340/5.22; 340/5.73; 340/5.2; 340/542; 70/332; 70/278.4; 341/35

(58) Field of Search ................................ 340/5.55, 5.2, 340/5.24, 5.22, 5.67, 5.73, 542, 5.7; 70/262–264, 286, 315, 332, 278.4; 341/35

(56) References Cited

U.S. PATENT DOCUMENTS 4,917,022 A 4/1990 Ogasawara et al.
5,061,923 A 10/1991 Miller et al.
5,517,184 A 5/1996 Miller et al.
5,684,457 A 11/1997 Miller et al.
5,777,559 A * 7/1998 Dawson et al. ............. 340/542
5,881,589 A 3/1999 Clark et al.
5,973,624 A 10/1999 Miller et al.

FOREIGN PATENT DOCUMENTS

EP 0 851 080 A2 7/1998

* cited by examiner

*Primary Examiner*—Donnie L. Crosland
(74) *Attorney, Agent, or Firm*—Arent Fox, PLLC

(57) ABSTRACT

An electronic combination lock having a knob which has no divisions or markings relating to the numbers of the combination thereon. The rotation of the knob drives a generator, which produces electrical power. The power generated serves as a power source for the electronics of the lock. A knob position detector indicates to the microprocessor the speed and amount of rotation of the knob. The timing capabilities of the lock provides the opportunity to set the minimum time that can be used in the entering of the combination. The lock waits a period of time, typically, two seconds between the entry of one element of the combination and the lock permitting the entry at the next element of the combination. The microprocessor will also keep a count record of all the failed attempts to open the lock since the last successful operation. If the numbers of tries or attempts to unlock the lock equals or exceeds the number set in the microprocessor microcode, the lock will fail to open even if an authorized combination is subsequently entered. After an error indication is displayed, the lock is disabled to prevent further entry tries, until the lock is reset. In order to eliminate the possibility of correlation between the number displayed and/or entered and knob position, there is a random time delay between the start of knob rotation and the incrementing the number displayed.

6 Claims, 22 Drawing Sheets

HIGH SECURITY ELECTRONIC COMBINATION LOCK

"This is a non-provisional application based upon an earlier filed U.S. provisional application, Serial No. 60/104, 955 filed Oct. 20, 1998."

BACKGROUND OF THE INVENTION

Mechanical combination locks such as those found on safes, vaults, cabinets and other high security enclosures are well known and subject to a number of attacks, such as by drilling, manipulation, and computer controlled auto dialing.

Electronic combination locks for such enclosures have been invented which provided the opportunity to increase the level of security afforded by the lock, while at the same time overcoming many of the shortcomings of the prior art mechanical locks. Two examples of these locks may be found at. U.S. Pat. No. 5,061,923 entitled Computerized Combination Lock and U.S. Pat. No. 5,517,184 entitled Electronic Combination Lock with High Security Features.

Recently an improved high security electronic combination lock has been invented which provides the opportunity to greatly increase the level of security afforded by the lock, while at the same time overcomes many of the short comings of prior art mechanical and electronic locks.

A dial type mechanical combination lock relies on the rotation of a knob to positions represented by numbers on the dial to rotate mechanical elements within the lock, such that the wheels of the mechanism align to allow a bar to drop into the wheels and retract the lock bar or bolt, allowing the enclosure to be opened.

The electronic combination lock does not have the equivalent mechanical elements and, therefore, cannot be attacked in the same manner. For example, the mechanical lock may be drilled to permit the insertion of an optical device into the lock mechanism to observe the positions of the wheels and thus their alignment, which permits the opening of the enclosure without the knowledge of the combination.

The electronic lock cannot be drilled for a similar purpose since the electronic lock mechanism will not reveal the position of any element, which gives the attacker any information as to the combination needed to unlock the device. The mechanical lock has a fixed position of internal elements relative to the dial and thus may be observed with the movements of the dial repeated by the attacker, at a later time. The electronic lock may not have a fixed knob to number position relation and thus observation of the movement of the knob is much more difficult if not impossible.

Dialers exist which may be attached to the knob on a mechanical or electrical combination lock and which dial combinations under the control of a computer. As each combination fails, the computer then continues to dial other combinations to eventually unlock the lock. With a combination lock of the mechanical type and sufficient time, a dialer is particularly effective.

Therefore an electronic combination lock is needed that limits the effectiveness of observation of knob position by employing a random time delay from the time the knob starts turning to enter a combination until the display is activated and begins incrementing the number displayed. Additionally, an electronic combination lock is needed that will, from a practical standpoint, prevent the use of an auto dialer or a person from determining the correct combination.

SUMMARY OF THE INVENTION

The electronic combination lock disclosed and described herein solves the problems discussed above and is a combination lock having a knob, which requires no divisions or markings relating to the numbers of the combination thereon. The rotation of the knob drives a generator, which produces electrical power. The power generated serves as a power source for the electronics of the lock. A knob rotation detector provides a signal to the microprocessor. The microprocessor utilizes this signal to determine the speed and amount of rotation of the knob.

The program controls the microprocessor. The ability to control the microprocessor with a microcode control program is an advantage in that the many functions and features may be added to make the lock mechanism and the enclosure more secure.

When the knob is rotated, the knob position detector sends a signal to the microprocessor. This signal is received by the microprocessor. The signal enables the microprocessor to determine the speed of rotation of the knob. As the speed of the rotation of the knob varies, the rate of change of the displayed numbers may change. This is accomplished so that at a high rate of knob rotation the displayed numbers may change at a high rate while at the lower rates or rotation, the rate of change of the displayed numbers may be at a slower rate. Further, the number of degrees the knob must be turned to effect the change of the displayed number will vary so that there may be no consistent amount of rotation required to change the displayed number by one unit. This aspect of the lock also acts to foil the use of a computer-controlled dialer.

The timing capabilities of the lock provide the opportunity to set the minimum time that can be used in the entering of the combination. The lock waits a period of time, typically, two seconds between the entry of one element of the combination and the lock permitting the entry at the next element of the combination. This wait time forces a large amount of time to be expended in trying each combination in an effort to open the lock. With a two-second wait between each combination element (0-99) and using a three-element combination it would take a minimum of 1,667 hours to enter the one million possible combinations.

The microprocessor may also count the failed attempts to open the lock since the last successful operation. If the numbers of tries or attempts to unlock the lock equals or exceeds the number set in the microprocessor microcode, the lock will fail to open even if an authorized combination is subsequently entered. After an error indication is displayed, the lock may be disabled to prevent further entry tries.

In order to eliminate the possibility of correlation between the number displayed and/or entered and knob position, there may be a random time delay between the start of knob rotation and the incrementing the number displayed.

When a condition is created where the lock will not open even with the eventual entry of the authorized combination, the lock electronics must be reset. The reset is accomplished by entering a reset combination or code.

A more complete understanding of the invention may be acquired from the following detailed description of the invention that follows.

DETAILED DESCRIPTION OF THE PREFERRED EMBODIMENT OF THE INVENTION

Figure 1:
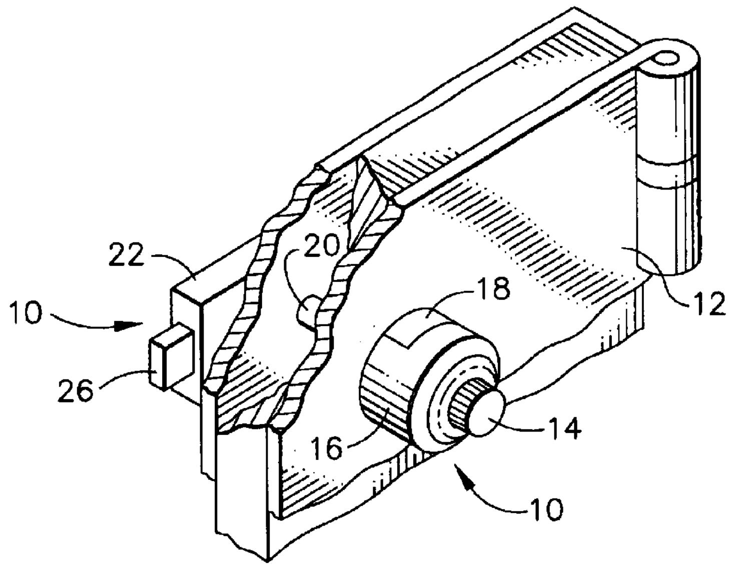
FIG. 1 shows the electronic lock positioned on the door of a safe or vault and shows the location of the display and the knob of the lock with no markings as are conventional on mechanical combination locks.

Referring to FIG. 1, the lock 10 in which the invention is embodied is shown mounted on a safe or vault door 12. The knob 14 is surrounded by a housing 16, which shrouds the periphery of the knob 14 and supports the display 18. Display 18 may be mounted separately from the knob 14. The display shown is a Liquid Crystal Display (LCD) module, but could be any other display device. The knob 14 is attached to a shaft 20 extending out the back of the knob mechanism, through the wall of the safe or vault door 12 and into housing 22 of the electronics 24 of the lock 10.

Extending from the housing 22 is a bolt 26 that is used to hold the door 12 shut when extended. Also contained in the housing 22 are the mechanical linkages and mechanisms which retract or extend the bolt 26 of the lock 10. An example of the preferred mechanical mechanism is disclosed in U.S. Pat. No. 5,881,589.

Figure 2:
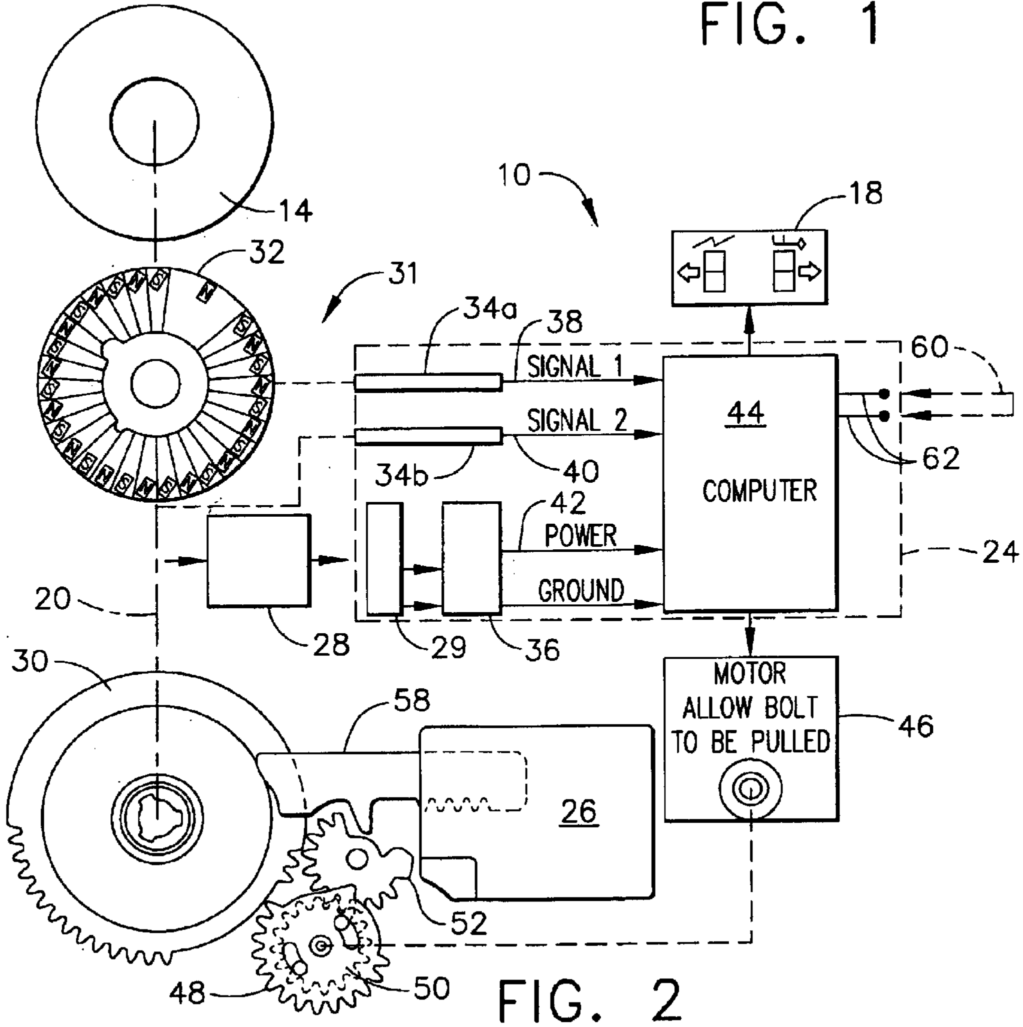
FIG. 2 is a schematic diagram of the lock and its associated electronics.
Figure 3:
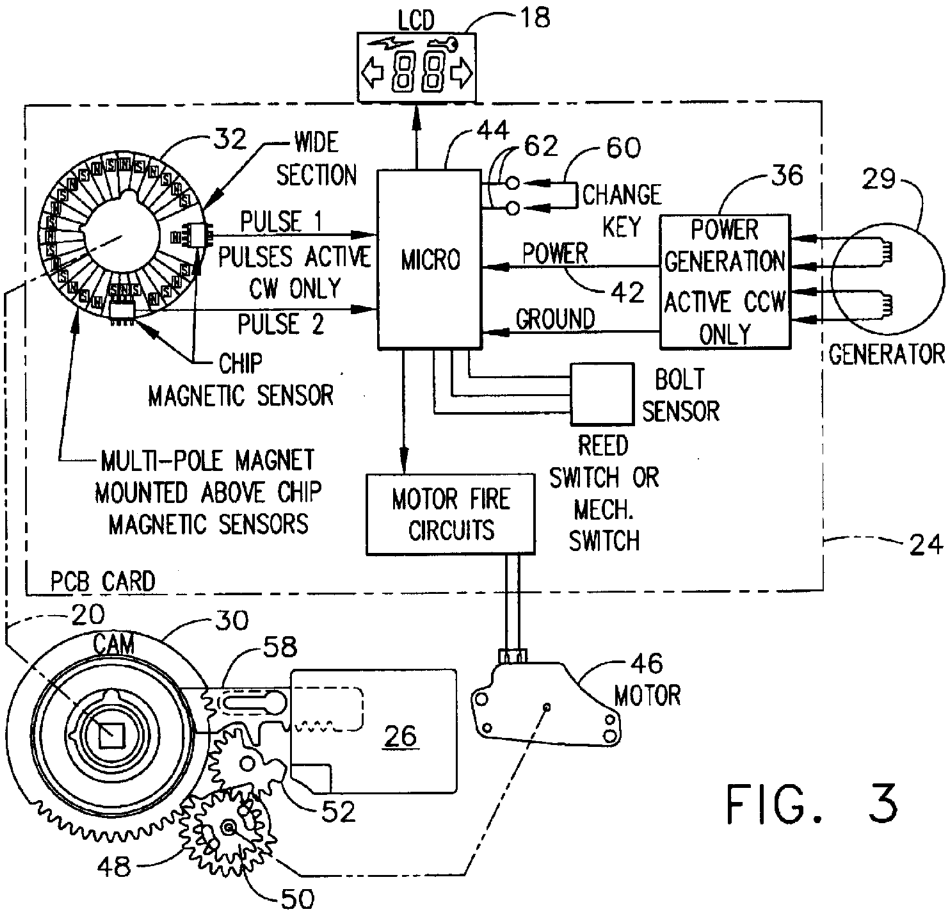
FIG. 3 is an alternate schematic diagram of the lock and its associates electronics.
Figure 4:
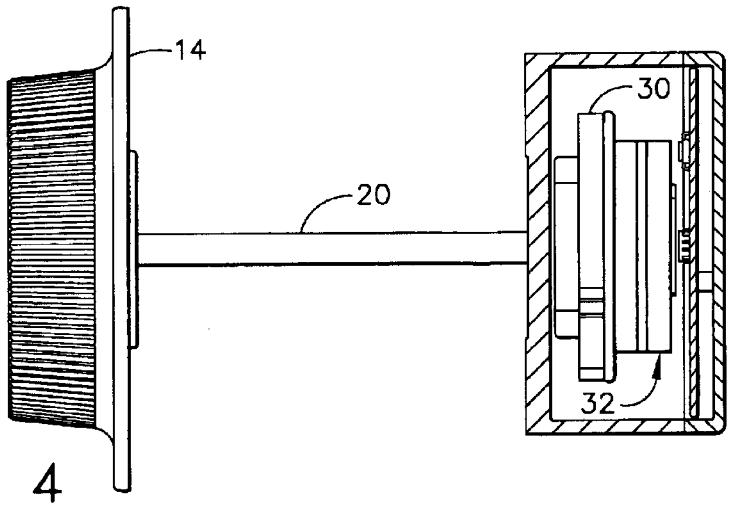
FIG. 4 is a side view of the lock.

In FIGS. 2, 3 and 4 the knob 14 is connected to the retractor drive 30. A generator 29 may be connected through a clutch and gear train 28 to knob 14. Generator 29 may generate the electrical power required by the electrical components of lock 10. Generator 29 may be a stepper motor, a conventional AC or DC generator, a battery, or any other power source that could provide the power required by the electrical circuits used to operate lock 10. Alternatively, lock 10 may be powered by an external power source, including, but not limited to, AC or DC line power, external battery, or other external signal that the lock 10 could convert into electrical power. Such external signals could include light, infrared, radio, or other signals in the electromagnetic spectrum.

Either knob 14, retractor drive 30, or shaft 20 typically interfaces with position detector 31. Detector 31 will typically have a rotation indicator 32 and at least one sensor 34. The rotation indicator 32 may trigger the first sensor 34*a* so that the amount of knob rotation may be determined. Additionally, a second sensor 34*b* may be employed when it is desired to know the position of retractor drive 30 with increased accuracy, for example, prior to rotating partial gear 48. Detector 31 may use a segmented magnet as the rotation indicator 32 and a GMR for sensor 34. Sensor 34 may be a device that can act as a switch. Examples of these sensors 34, include, but are not limited to, hall effect devices, photoelectric circuits, reed switches, micro-switches, opto-isolaters, optical diodes, or similar devices. Rotation indicator 32 may be any device that can activate the sensor 34 selected. The output from the sensors 34*a* and 34*b* are then fed to the microprocessor 44 over signal lines 38 and 40 respectively.

The power control device 36 charges an internal capacitor with the electricity generated by the generator 29. The voltage of the capacitor is then supplied over the power line 42 to the microprocessor 44. The microprocessor 44 is powered for a limited time with the voltage, stored in the capacitor within power control 36. Powered time of the microprocessor 44 is dependent upon the capacitance of the capacitor and the current drain of the microprocessor 44 and display 18. The size of the capacitor(s) may be selected in coordination with the power requirements of the remainder of the system to provide power to the system for approximately 90 seconds after the generator 29 has ceased to generate power. This time period, typically, provides adequate time to open the lock 10 or to pause in the entry of the combination without losing the previously entered elements of the combination.

Microprocessor 44 provides outputs to display 18. The display 18 is capable of displaying numerals of at least two digits. Additionally, display 18 may be capable of displaying symbols such as a lightning bolt for an error symbol, a key symbol for selection of the combination change mode, and/or arrows. These symbols may aid the operator in using the lock 10.

The display 18 may be a Liquid Crystal Display or LCD device, which has the advantage of being a relatively low consumer of electrical power. Low power consumption may be a consideration when power is generated by the rotation of the knob 14 and the quantity of power generated may be relatively small when stored within the components of the electronics of the power control components 36.

As described in greater detail in U.S. Pat. Ser. No. 5,881,589 one device for withdrawing the bolt uses an output from microprocessor 44 to a latch motor 46. Motor 46 acts to rotate a partial gear 48 to position the partial gear in a position whereby it may be driven rotationally by a series of gear teeth on the periphery of the retractor drive 30. The partial gear will mesh with the drive 30 and be driven by the rotation of the knob 14. The partial gear, in turn, will drive a coaxially disposed second gear 50. The second gear 50 is driven by a pin/slot, lost motion, arrangement wherein the second gear 50 carries a pair of pins that reside in a pair of slots formed into the partial gear 48. The rotation of the partial gear 48 is a lost motion rotation for a short portion of the movement, at which point the pins and the slot ends are engaged to provide a positive drive of the second gear 50.

In turn, the second gear is meshed with an idler gear 52. The idler gear 52 further is meshed and mated with a rack 58, which either is attached to or forms a portion of the bolt 26 of the lock 10.

With partial gear 48 in the engaged position shown in FIG. 2, rotation of the knob 14 and thereby retractor drive 30 provides the necessary drive forces to drive the gear train gears in their respective directions of gear rotation and, accordingly, provides the forces necessary to drive the rack 58 of the bolt 26 to withdraw the bolt 26 or conversely to extend the bolt 26, depending upon the direction of rotation of the knob 14. In order to ensure that the bolt 26 is only withdrawn at appropriate times, whenever a valid combination has been entered into the electronics of the electronic lock and not at other times, the latch motor 46 controls the engagement of the partial gear 48 with the gear teeth on the retractor drive 30. During periods that the lock is to be left in a secure condition, the partial gear 48 is disposed in a position whereby the teeth on the retractor drive 30 cannot engage the teeth on the partial gear 48. Alternatively, other devices for withdrawing and extending the bolt may be employed. An example of another device includes, but is not limited to, that shown in U.S. Pat. No. 5,487,290.

The microprocessor 44 may be any suitable microprocessor manufactured and sold on the market. The lock 10 may utilize a microprocessor designated 80C51F and manufactured and sold by Oki Electric Industries Company, Ltd, of Tokyo, Japan.

Figure 5:
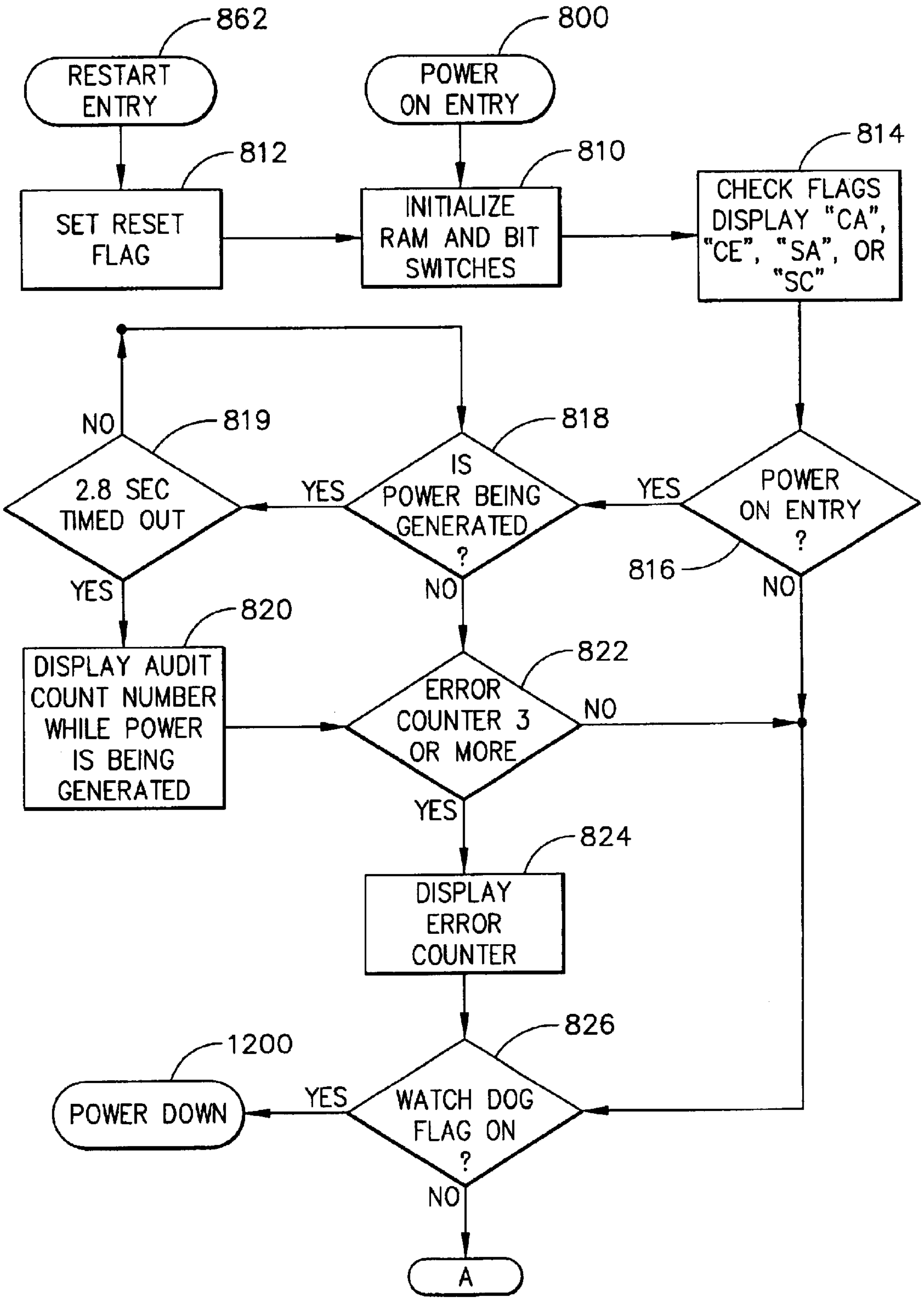
FIG. 5 is a functional flow diagram of the logic control of the microprocessor of the electronic lock, showing the overall operation and control of the lock.

The operation of the microprocessor is represented by the flow diagram of FIG. 5. The following description will explain the microprocessor 44 logic operations and flow as the lock 10 is operated.

Microprocessor Operation and Control

Figure 6:
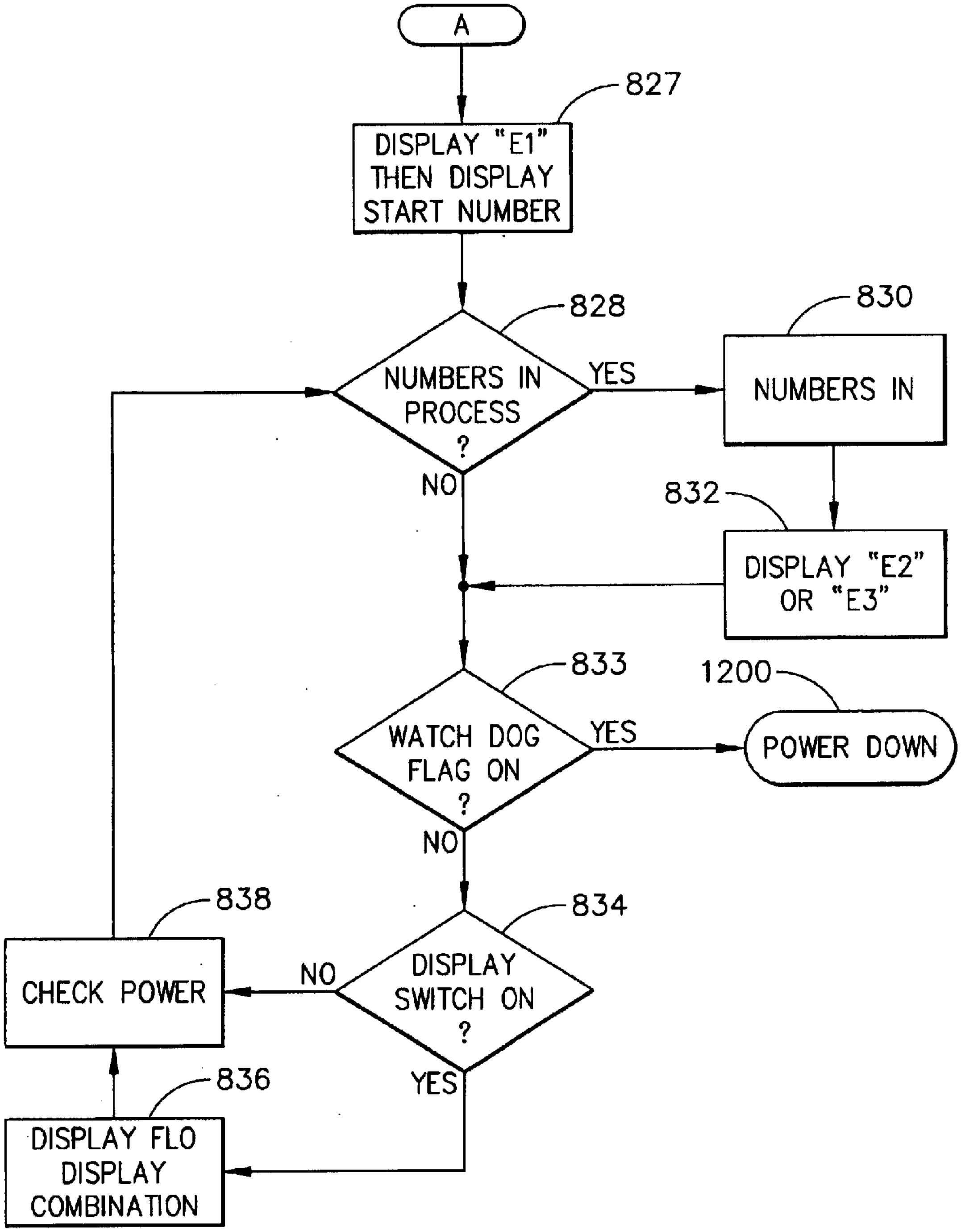
FIG. 6 is a continuation of the functional diagram of FIG. 5.

Referring to FIGS. 5 and 6, the system begins functioning when the generator 29 provides sustaining power to the electronic logic or microprocessor 44. This is represented by terminator 800.

When sufficient power has been provided for a fixed time period, the system may initialize the ports, EPROM, LCD, counters, and variables in operation 810. Typically this fixed time period is approximately two seconds. Additionally, the Random Access Memory (RAM), within the microprocessor 44 may be initialized with all bit switches or flags set to their default conditions, or to the conditions required/allowed/provided by the reset switch in operation 810. These operations condition the system to accept inputs from sensor 34*a* of the lock 10.

The lock program may be restarted without the lock turning off. This is represented by terminator 862. When a program restart is performed a restart flag may be set in operation 812. This flag controls the initialization process of operation 810. The program flow then moves to operation 814.

The microprocessor 44 in operation 814, checks to see if the lock 10 has been attacked by checking the "CE" and "SA" flags and then generating a signal that may display a "CA", "SA", "CE", or "SC" on display 18. The "CA" indicates that the lock 10 is ready to accept a combination element entry. The other three codes indicate that the lock 10 has been attacked in some manner and that the lock 10 must be reset. Alternatively, other symbols could be used to indicate if the lock had been attacked. Furthermore, display of a code or symbol is not required and could be omitted.

In decision 816, a determination is made as to whether this startup is the result of a power on entry or a restart entry of the lock program. One method of checking for a power on entry is to check to see if the restart flag or bit is set to "NO". If this operational sequence of the system is due to power on, the flow is to decision 818 where the microprocessor 44 checks to see if the generator 29 is still producing power. If the generator 29 is not producing any power the flow branches to decision 822. When the generator 29 produces power, the microprocessor 44 checks to see how long the power has been produced in decision 819. If the generator has produced power for longer than a predetermined time period, for example, 2.8 seconds, then the audit and seal counters may be displayed, in operation 820.

The flow from decision 818 and operation 820 both converge on decision 822 where it is ascertained if the error counter is equal to or exceed a predetermined number, typically 3 or more. If not, the flow branches around operation 824 to decision 826. If the error counter contains a count of 3 or more, the flow is to operation 824 where the number of errors may be displayed. Thus, showing the operator the number of unsuccessful attempts made to open the lock since the last successful entry.

Thereafter the flow may move to decision 826, where microprocessor 44 checks to see if the watchdog flag is set. The watch dog flag, when set indicates that the lock has been left with the knob 14 unmoved for a fixed period of time, for example, five seconds. If the flag is set, then the lock may turn off by the Power Down subroutine represented by terminator 1200.

When the watch dog flag is not set, the flow may move to operation 827. In this operation a symbol may be displayed to prompt the operator to begin entering the combination, for example, "E1" may be displayed, and then the processor waits for the knob 14 to rotate. The microprocessor 44 may wait until the knob 14 rotates in the clockwise direction and the sensor 34*a* sends at least a predetermined number of signals to microprocessor 44 before displaying any numbers. Thus, the knob may rotate before displaying numbers on display 18. Additionally, the processor 44 may wait a random time period, typically between zero and two seconds while the knob rotates before displaying numbers on display 18. This random delay time inhibits the ability of an observer to correlate knob position with the combination entered. Optionally, there may be a decision as to whether the NUM2 switch is "ON" or set. When the NU2 switch is "ON" the microprocessor 44 may send a signal to display a "00" and the NUM2 switch would be changed to "OFF". If the NUM2 switch is "OFF" a signal may be sent to display a "50" on LCD display 18 and the NUM2 switch would be changed to "ON". Alternatively, any other number including a random number could be used instead of the "00" or "50".

The functional flow then may move to decision 828 where microprocessor 44 determines if a combination element has been entered. If a combination element was entered, the flow moves to block 830, which represents the Numbers In subroutine shown in FIG. 9. Following reentry to the main system flow from FIG. 9, either an "E2" or "E3" may be displayed in operation 832. An "E2" is displayed to prompt the operator to enter the second combination element and an "E3" is displayed to prompt the operator to enter the third combination element. Alternatively, any other symbol or prompt could be used. In some embodiments it may be desired to blank the display after the entry of a combination element, i.e. no prompt. A blank display 18 may make it more difficult for a person to gain entry with out the authorized combination since the person would not know how many combination elements the lock 10 required.

The flow from decision 828 ("NO" branch) or operation 832 could then move to decision 833, where the watch dog flag is checked. If the watch dog flag is set, "ON," then the lock may turn off at terminator 1200 using the Power Down subroutine.

With the watch dog flag "OFF" the flow continues to decision 834. The microprocessor 44 may check the display switch in decision 834. If the display needs to be updated due to knob rotation or program function, the display switch or bit is "ON". When display 18 shows up-to-date information, the display switch or bit is "OFF". With the display switch "ON" the flow moves to operation 836 which represents the Display.Flo subroutine shown in FIG. 7. Alternatively, any other method of updating the display 18 may be employed.

Figure 7:
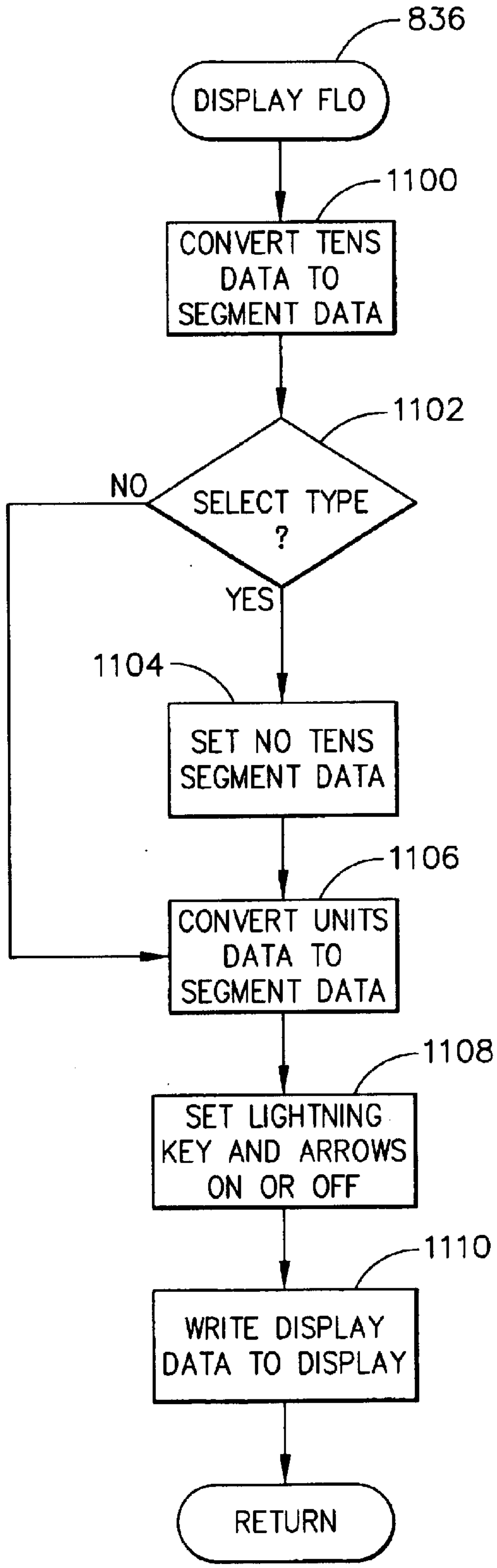
FIG. 7 is a logic flow diagram representing the logic and operations to display numbers and symbols on the display.

When the display bit or switch is not on, or upon completing the display subroutine of FIG. 7, the flow enters operation 838 where the microprocessor 44 may check the voltage to ensure sufficient power is available to operate lock 10. Thereafter the flow loops back to decision 828 discussed above.

Contained within the functional flow chart shown in FIGS. 5 and 6 are the following subroutines: 1) Display.Flo—controls the display 18; 2) Power Down—shuts off the power to proessor 44; and 3) Numbers In—process the combination numbers. The Display.Flo subroutine 836 is discussed first.

Display Control

Block 836 of FIG. 6 is further expanded in FIG. 7. The Display Flo subroutine 836 converts the number/character data into a format that can be utilized by the display selected. Referring to FIG. 7, the flow enters at block 836 and then converts the tens data to segment data in operation 1100. The display 18 displays characters and/or numbers made up of segments that are turned on or turned off and the ones turned on in conjunction with the others turned off form contrasting bars against the background of the display, making visible characters and/or numbers. This operation 1100 converts, through a table look up, the character and/or number in the tens position of the display, to data bits, ones and zeros, necessary to turn on or off the segments of the display in the tens position.

Next a check in operation 1102 may be made to ascertain if the display is displaying a combination character and/or number or a character and/or number which represents the mode of the lock 10. The mode of the lock, if utilized, may condition the lock 10 to be opened with one combination, a minimum of two combinations or a combination which must be entered before any second combination is entered, known as the senior/subordinate mode. When the display 18 is responding to the operation of the lock 10 to indicate what mode it is to operate in, the display 18 may display a single digit, indicating to the operator that a combination is not being entered. During this phase of the lock 10 operation, operation 1102 may pass the flow to operation 1104 where the segment data for the tens position of the display 18 will not be set. When the lock 10 is in its normal operational mode of accepting combination input, the flow may move through the NO path from operation 1102 around operation 1104, to operation 1106 where the units data is converted to segment data in the same manner as the conversion in operation 1100. Then the lightning bolt, key and left and right arrows may be set ON or OFF as appropriate.

After converting the data into display data, the display data may be written to the display 18 to cause the display to show the appropriate symbols, in operation 1110. Thereafter, the flow returns to operation 838 of FIG. 6.

Power Down

Figure 8:
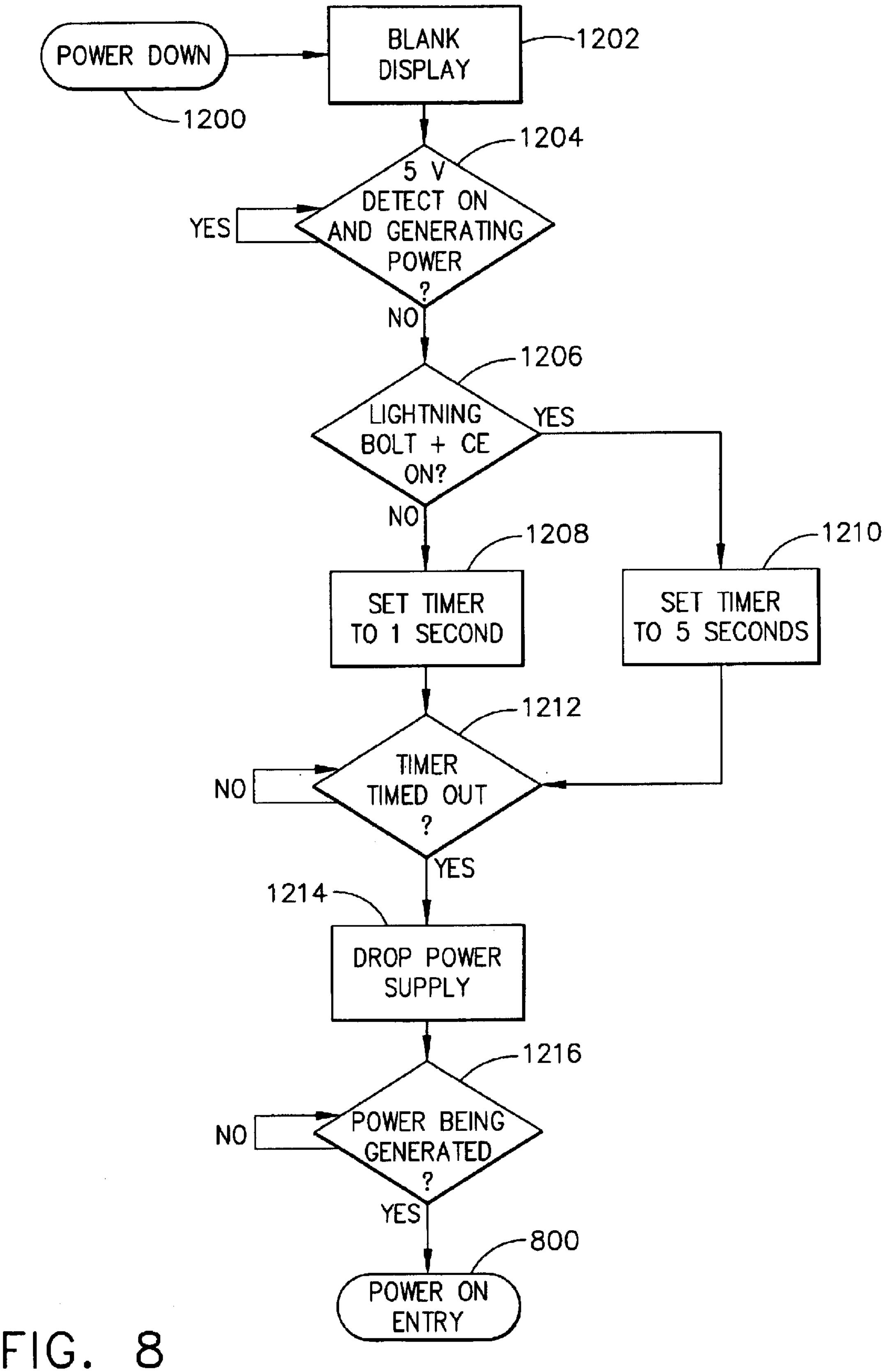
FIG. 8 is a logic flow diagram showing a functional flow chart for the Power Down subroutine.

Referring to FIG. 8, terminator 1200 represents entry into the Power Down subroutine. Typically, the microprocessor 44 blanks the information displayed on display 18 in operation 1202. In some embodiments, the lightning bolt (error symbol) could remain displayed to indicate an error condition. Blanking the digits displayed reduces the consumption of electricity by lock 10. In some embodiments display 18 may continue to display information until the processor and/or power supply is shut down.

The flow may then continue to decision 1204 where microprocessor 44 waits until the generator is not producing power and/or less than five volts is detected in the power storage device. The microprocessor could consider one of these two conditions before continuing to decision block 1206. Thus, the lock 10 does not require the power storage device to discharge in order to conserve power and to reduce the power generation requirements for the next lock operation. In some embodiments of lock 10, for security or other reasons, the microcode may require the voltage of the power storage device to drop below a fixed value before completing the power down sequence. This fixed voltage is approximately five volts, however the voltage used for a particular lock 10 will depend on the voltage required to operate the electronics 24.

While the program flow may travel directly from block 1200, block 1202, or decision 1204 to operation 1214, the flow may move to decision 1206. The microprocessor 44 may check both the CE flag or switch and the error counter in decision 1206. When both the CE flag is "ON" and the error counter is greater than a fixed number, typically zero; then a timer may be set for a time fixed in the microcode, typically five seconds. This five-second delay provides increased security for the lock by delaying further entry attempts under these conditions. Alternatively, microprocessor 44 at decision 1206 could check for error, covert entry (CE), or suspicious attempts (SA), or any other condition using "OR", "AND", or a mix of "OR" and "AND" logic to provide the level of security desired by the lock manufacturer or lock user. If the security condition check of decision 1206 indicates that long delay is not required the timer may be set for one second in operation 1208. The one second and five second times are illustrative and may be set for any duration desired.

Next the flow continues to decision block 1212 where the microprocessor 44 waits for the timer set in operation 1208 or 1210 to expire. Thereafter, microprocessor 44 turns off when the power supply is dropped in operation 1214. When power is once again generated in decision block 1216 the lock-operating program could resume with a power on entry illustrated by terminator 800 (FIGS. 5 and 8). Alternatively, the microprocessor 44 could test for power generation between decision 1212 and operation 1214. In this case, if no power generation was detected the microprocessor 44 would be shut down. When power was being generated, however, the lock could restart at terminator 862 at FIG. 5. The above alternative may provide for faster lock response in some situations.

Numbers In

Figure 9:
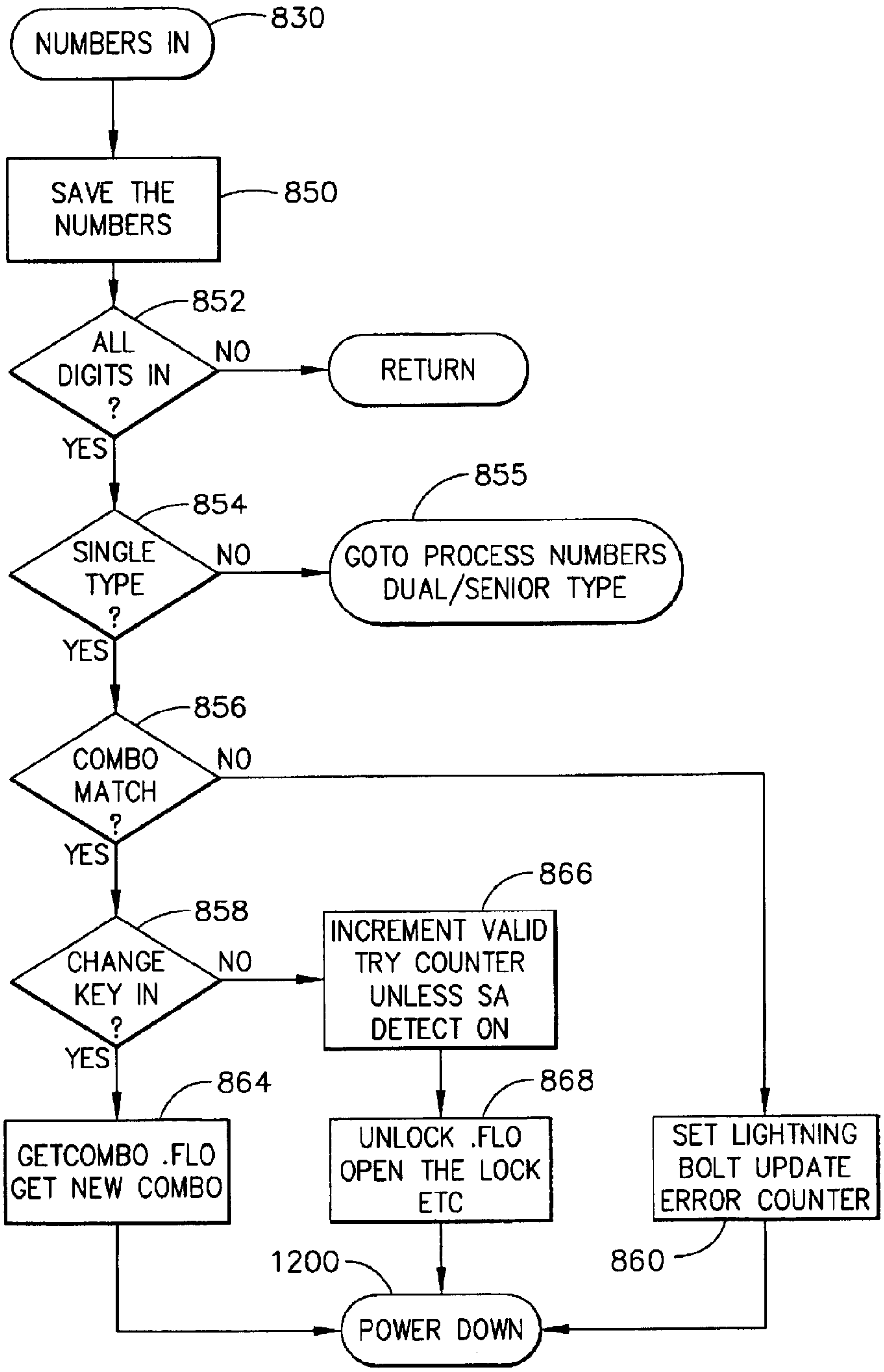
FIG. 9 is a logic flow diagram showing the logic operations used in the Numbers In subroutine.

Referring to FIG. 9, Block 830 represents entry into the Numbers In subroutine. The numbers in the combination counter, and shown on the display 18 may be saved as an element of the combination in operation 850. Thereafter, the program logic checks for entry of all elements of the combination in decision 852. A combination may use three combination elements. The lock, however, may be programmed to use any number of elements desired. A larger number of combination elements results in a larger number of possible combinations. The larger the number of possible combinations tends to result in a higher level of lock security. If all elements have not been entered, then the flow returns to the main program flow.

Figure 10:
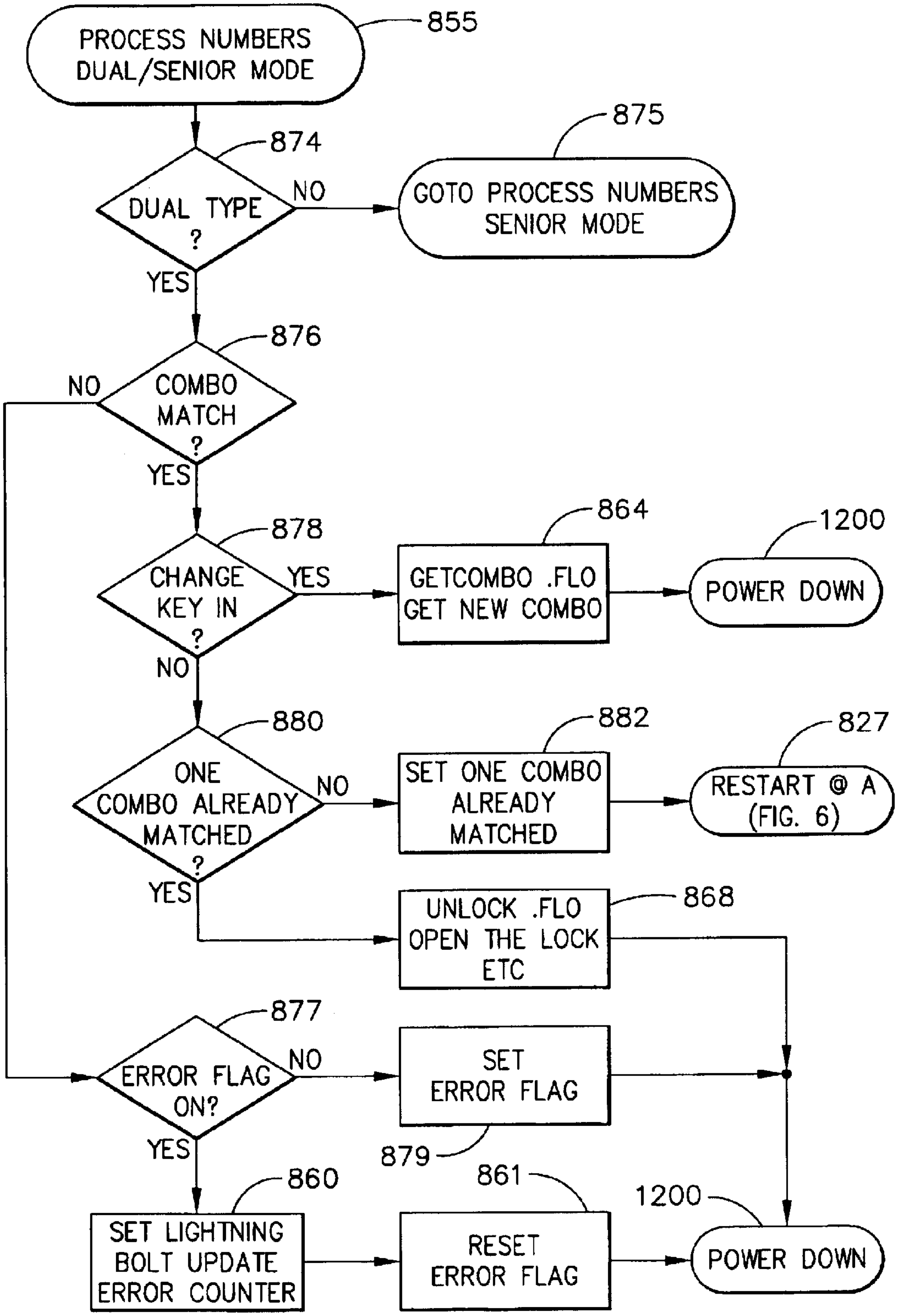
FIGS. 10 and 11 show the logic flow diagrams representing the subroutine operations that control the electronics when two combinations are required to open the lock.
Figure 11:
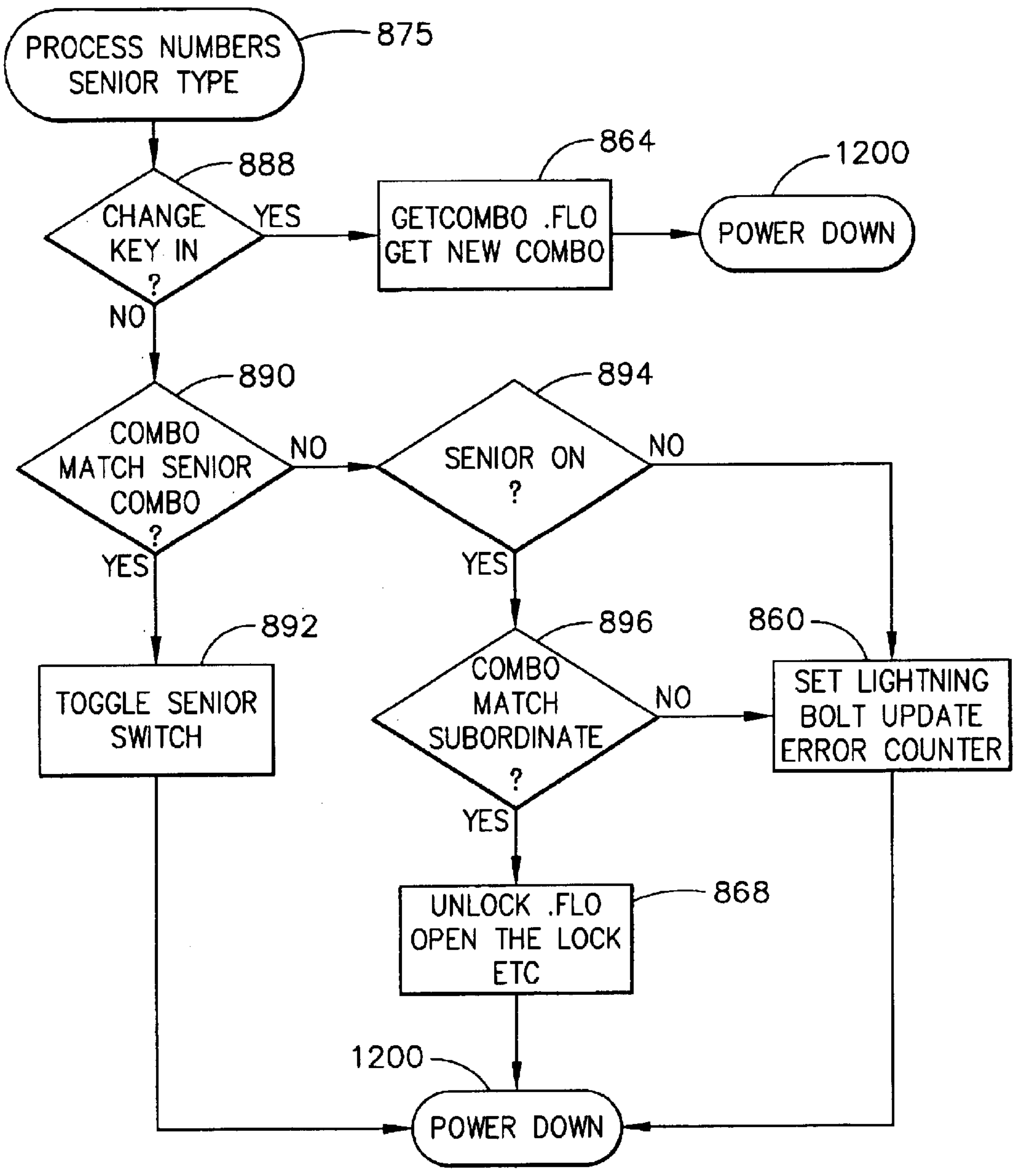

When all the numbers for the combination have been entered, then there may be a determination at decision 854 as to whether the operation of the lock is conditioned for single combination operation; and if true, the combination is compared with the stored authorized combination in decision 856. If on the other hand the lock is not conditioned for single combination operation, the flow branches at decision 854 to the Process Numbers Dual/Senior Type subroutine 855 shown in FIG. 10. In embodiments of lock 10 employing single combination for entry neither decision 854 nor the Process Numbers Dual/Senior Type subroutine 855 would be required.

The entered and authorized combinations are compared at decision 856. If the combination does not match then the error signal may be set and the error counter may be updated by incrementation in the lightning error subroutine shown in FIG. 12 and represented by operation 860. Thereafter, the flow may move to the power down subroutine represented by terminator 1200.

Referring back to FIG. 9, if the combination matches in decision 856, the ports 62 of microprocessor 44 may be checked to see of the change key 60 has been inserted. If the change key 60 has been inserted into the ports 62, then the flow may move to block 864 which represents the subroutine shown in FIG. 13. Upon completion of the routine of FIG. 13, the may move to the power down subroutine represented by terminator 1200.

If the change key 60 has not been inserted, then the flow at operation 858 can branch to operation 866 where microprocessor 44 increments the valid try counter unless the SA detect flag/switch is "ON". Thereafter, the program flow may move to the Unlock Flo subroutine shown in FIG. 16 and represented by block 868. Upon completion of the routine in FIG. 16 the lock is either opened; restarted; indicates an error, if errors are displayed; or shut down.

Lightinig Error

The Lightning Error subroutine is employed to provide the lock operator with a visible indication that either the current operator or a prior operator entered an incorrect combination.

Figure 12:
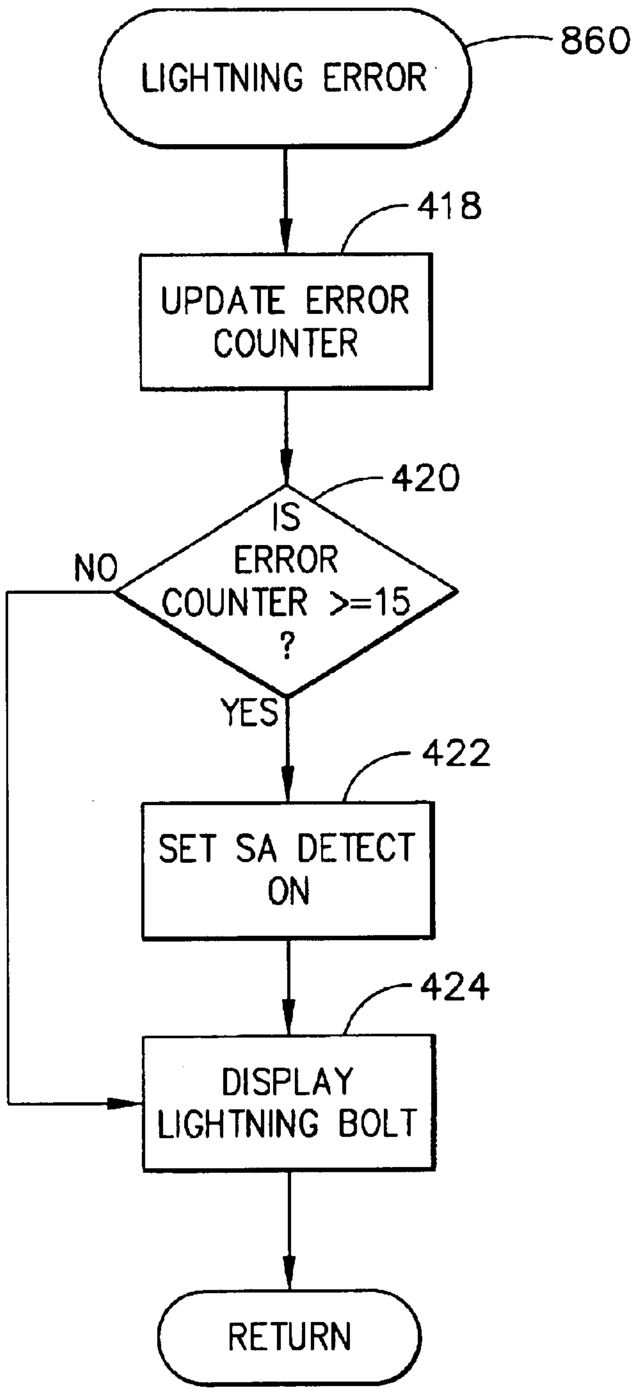
FIG. 12 is a logic flow diagram showing the logic control operations that tabulate the number of times errors occur in attempting to open the lock, and the preventing of the opening of the lock if the number of erroneous attempts exceeds a predetermined number, with the resulting lock out of the opening commands, if the correct combination is entered.

Referring now to FIG. 12 illustrating the Lightning Error subroutine. The entry point for the subroutine is represented by terminator 860. First, the error counter is incremented in operation 418. Thereafter, microprocessor 44 checks to see if the error counter is larger than a predetermined number in decision 420. This number may be approximately fifteen. If the error counter is smaller than the predetermined number, the flow branches around operation 422 to operation 424.

When the error counter is equal to or exceeds the predetermined number, the microprocessor 44 will set the SA detect switch "ON" in operation 422. Thereafter, the flow may move to operation 424 where an error symbol may be displayed. A lightning bolt is an example of one symbol that may be utilized as an error symbol. Thence, the program flow may return to the main flow.

Combination Change

Figure 13:
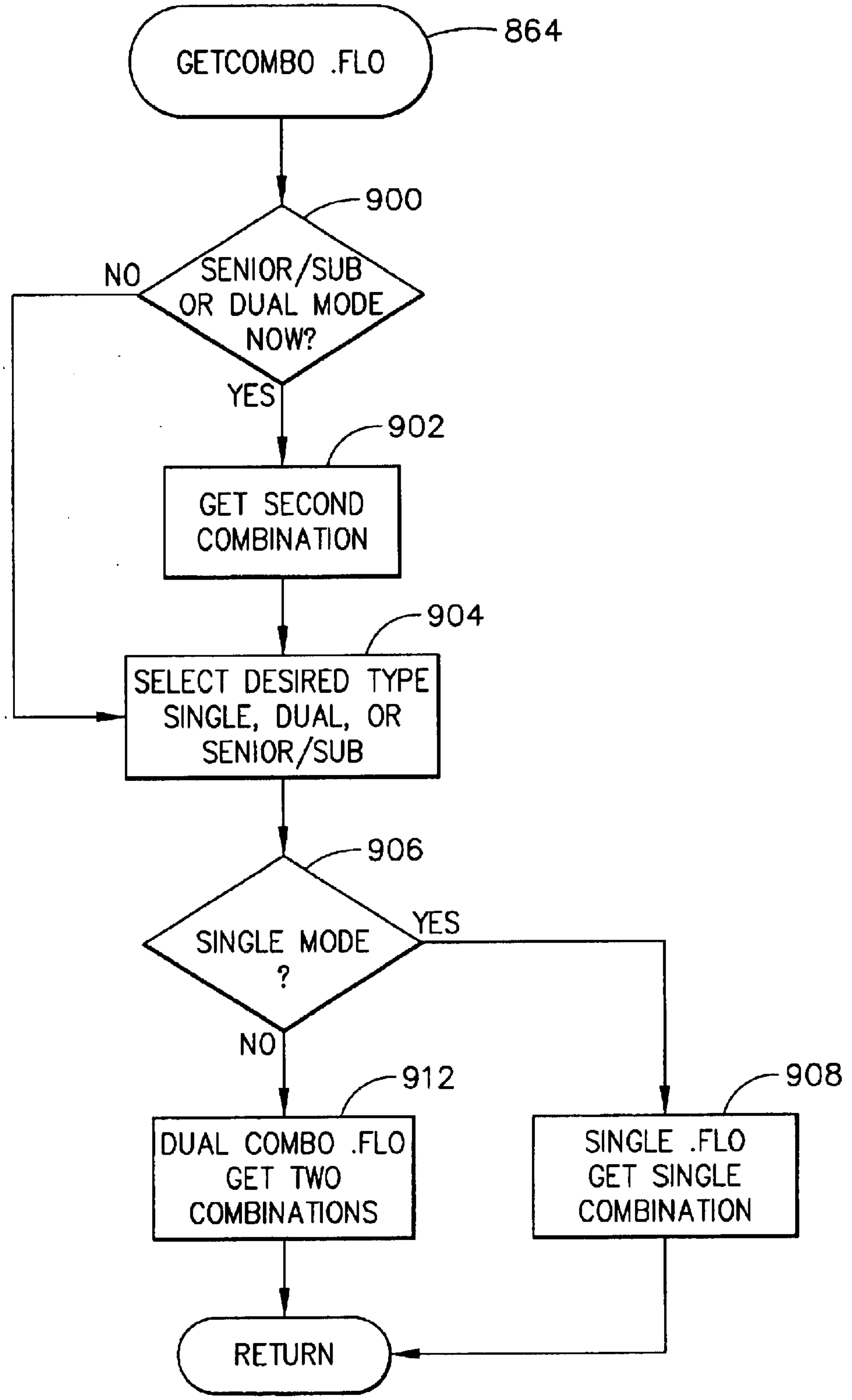
FIGS. 13–17 are flow diagrams expanding operations illustrated in the previous figures.

Referring now to FIG. 13 showing the Get Combo.Flo subroutine. This subroutine may be employed to change the combination for the electronic lock. The mode of the lock may check to see if a second combination is required to open the lock, in decision 900. If not, the flow branches around operation 902 to operation 904. If a second combination is required to open the lock, then the second combination may be obtained in operation 902, from the knob input as discussed above for FIGS. 5–11.

Figure 14:
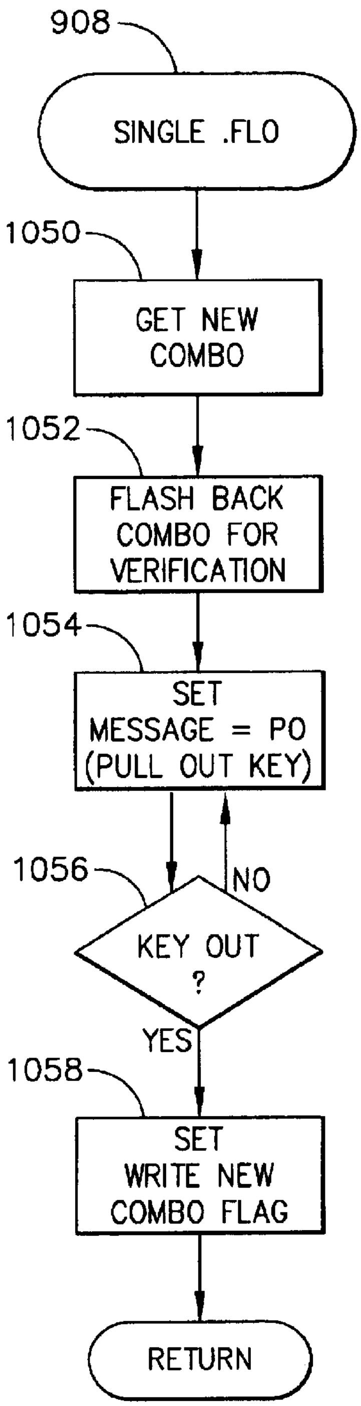

After receiving the second combination, if required, the type or mode of operation for lock 10 may be selected, for example, as either single, dual or senior/subordinate mode in operation 904. When single combination mode is selected, decision 906 moves the flow is to operation 908 which represents the Single.Flo subroutine shown in FIG. 14; when the routine in FIG. 14 is complete, the flow returns to the main program flow where the new combination is acquired. To enhance the security of lock 10 the new combination may be required to be entered on the same power cycle.

Figure 15:
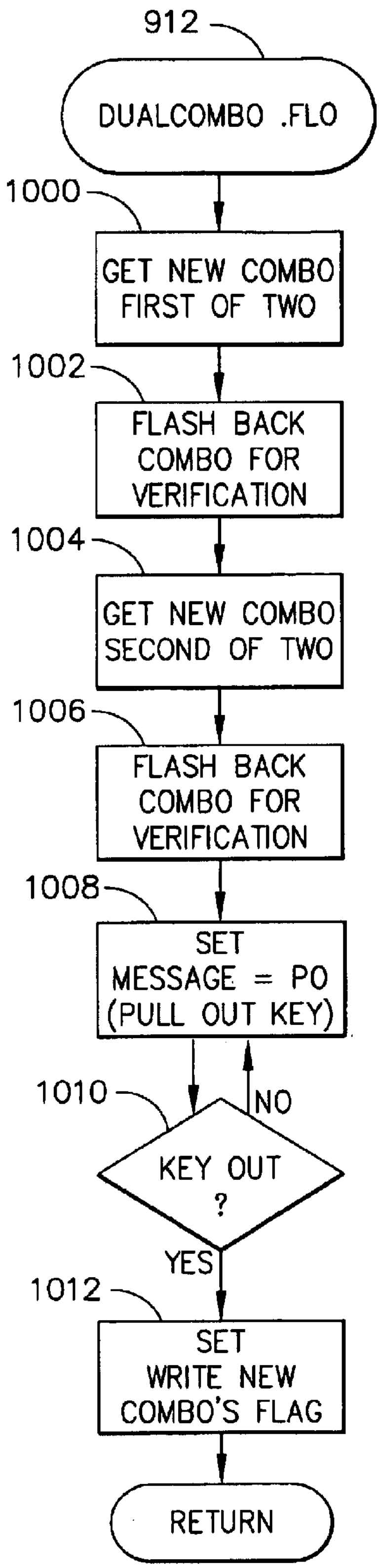

If the determination at operation 906 is that the lock is operating in a mode other than a single mode, the flow is to block 912 which represents the Dual Combo.Flo subroutine of FIG. 15, and when that subroutine is complete, the flow returns to the main program flow where the operator(s) enter two combinations. Some embodiments of lock 10 may utilize only a single combination to open the lock. Consequently, only block 908 could be employed to change the combination.

Referring again to FIG. 13, block 908 represents the Single.Flo subroutine illustrated in FIG. 14. Thus block 908 is expanded into a subroutine and when the subroutine in FIG. 14 is complete, the flow returns to FIG. 13.

In FIG. 14, the flow enters the subroutine at 908 from FIG. 13 and the new combination may be entered by the operator in block 1050. The combination entry process was previously described in FIGS. 5–11, above.

To allow operator verification, once the combination has been entered, it may be flashed back on the display 18 to the operator. After the combination has been displayed to the operator, operation 1054 may provide a message to the operator prompting the operator to pull out the change key 60 from the ports 62. One message that may be displayed is "PO". Alternatively, any other message could be used to prompt the operator in operation 1054. Additionally, the microprocessor may not provide any signal and may wait for the operator to remove the change key 60.

The electronic control may then wait in operation 1056 until the change key 60 has been removed from ports 62. The removal of the change key may signify the completion of the combination change. When the key 60 has been removed, the control logic flow may progress to operation 1058 where the new combination flag may be written into memory. Thereafter, the flow may return to the flow of FIG. 13 where the operator may be prompted to confirm the combination by entering the new combination. If the combinations do not match, then the new combination may not be saved and the operator may repeat the combination change process. When the combinations match the new combinations may be saved as the new authorized combination for the lock. Alternatively, the combination entered may be saved without verifying the changed combination.

Unlocking and Opening the Lock

Figure 16:
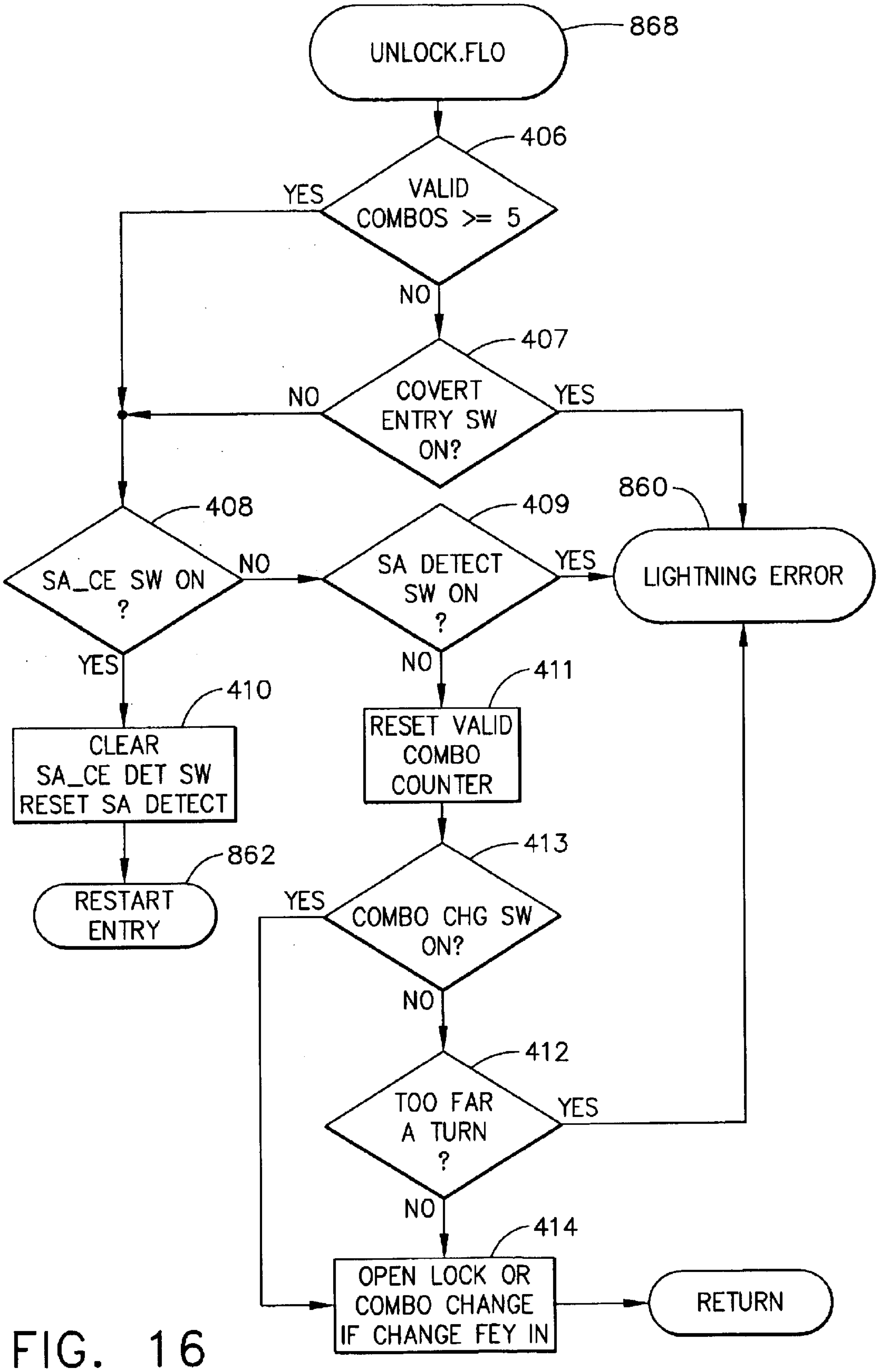

Referring back to FIG. 9, block 868 represents the Unlock.Flo subroutine shown in FIG. 16. This subroutine permits opening the lock when the correct combination is entered unless the operator has been locked out. In FIG. 16, the number of valid combinations entered is checked, in decision 406 to determine if this number is greater than or equal to a predetermined number and if the number is less than the predetermined number the flow may move to decision 407 where the where the microprocessor 44 checks to see if the covert entry (CE) flag or bit is set "ON". If the CE flag is "ON" then the flow would go to the Lightening Error sub-routine of FIG. 12 represented by terminator 860.

Typically, when the CE flag/switch is "ON", lock 10 can not be opened until the entry of a CE reset combination. There exist situations, however, when a safe, vault, or other security container must be opened before the person with the CE reset combination can arrive. Therefore the Unlock Flo subroutine may permit opening the lock after the entry of five consecutive valid combinations. Some embodiments of lock 10 may not utilize the covert entry (CE) feature. Thus, decision blocks 406 and 407 may be omitted.

When the valid combination counter is greater then or is equal to the predetermined number or the CE flag is set "OFF", the microprocessor 44 checks to see if the SA-NE switch or flag is set "ON" in decision 408. The SA-CE switch may be ON after the operator enters a valid CE reset combination as part of the SA reset subroutine shown in FIG. 29. If the SA-CE switch is "ON", then the flow may move to operation 410 where the SA-CE switch is cleared (set to "OFF") and the SA Detect switch is reset. The flow may then move to operation 862, where the program restarts as shown in FIG. 5.

If the SA-CE switch is "OFF" then the flow may continue to decision 409 where the status of the surreptitious attempts (SA Detect) switch is checked. If the SA Detect switch is ON, then the flow may move to the Lightening Error sub-routine represented by terminator 860. When the SA Detect switch is OFF the flow may continue to block 411 where the valid try counter could be reset.

The microprocessor 44 may then check to see if the combination change (Combo Chg Sw) switch or bit is set on in operation 413. If the Combo Chg Sw is "ON" and the CE flag is "OFF" then the flow may move to block 414 to open the lock 10 using the subroutine shown in FIG. 17. When the Combo Chg Sw is set "OFF" or the CE flag is "ON" then the microprocessor 44 may check to see if the knob 14 has been turned too far without stopping in decision 412. If the knob 14 has been turned too far then the flow will be to terminator 860 representing the Lightning Error subroutine. The amount of knob 14 rotation required to signal that the knob 14 has turned to far without stopping may be set by the programmer in the microcode. Knob 14 rotation without stopping may be limited to the range of one turn (360 degrees) to three turns (1080 degrees). If the result of decision 412 is negative the flow will continue the OpenLock.Flo subroutine represented by operation 414.

Figure 17:
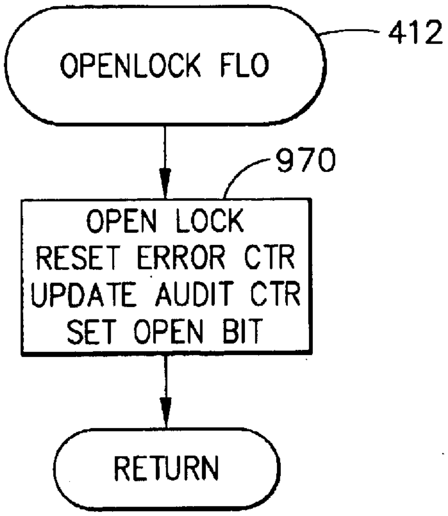

Referring now to FIG. 17, in operation 970, the lock is opened or conditioned for opening and the error counter is reset. The contents of the error counter is representative of the number of unsuccessful attempts to open the lock 10 following the last successful operation. Further, the audit counter is updated by incrementing its contents to reflect the latest successful entry. Then the flow may return to the program flow illustrated in FIG. 9 where the lock 10 may enter the power down subroutine represented by terminator 1200.

Dual and Senior/Subordinated Combination Feature

Referring back to FIG. 9, decision 854, if the lock 10 requires more than one combination to unlock the lock 10, then the flow branches to the Process Numbers Dual/Senior Type Flow represented by terminator 855. The flow from terminator 855 continues to FIG. 10. Here, microprocessor 44 determines if the lock 10 is in the dual combination mode in decision 874. When the operation is a dual combination type operation the combination match is checked in decision 876 and if the combination does not match either authorized combination, the error flag is checked at decision 877 and if ON the lightning bolt is displayed in the Lightning Error Subroutine represented by operation 860 and the error counter updated. The error flag is then reset in operation 861.

Should the error flag be OFF in decision 877, the error flag is set in operation 879. The flow from operations 879 and 861 is to the Power Down subroutine represented by terminator 1200.

When the combination matches, the ports 62 of the microprocessor logic control device 44 may be checked to see if the change key 60 is inserted in decision 878. If not, the decision is made in operation 880 as to whether one combination has already matched and, if so, the flow is to the OpenLock.Flo subroutine in FIG. 16, previously described. If decision 880 determines that no previous combination has been matched, then a flag is set in operation 882 and the flow moves back to the reentry point. Typically, this reentry point may be at point A or operation 827 of FIG. 6 and is represented by terminator 827.

If the change key 60 is detected in decision 878 the flow may move to the GetCombo.Flo subroutine represented by operation 864. Thereafter, the flow could move to the Power Down subroutine represented by terminator 1200, both previously described.

Referring back to decision 874, if the lock is not conditioned to open in response to a dual combination entry, then the flow branches the Process Numbers Senior Mode flowchart represented by terminator 875. The flow from terminator 875 continues on FIG. 11. The change key 60 may be detected in decision 888. When the change key 60 is preset the flow may move to the GetCombo.Flo subroutine represented by block 864. Thereafter, the flow could move to the Power Down subroutine represented by terminator 1200, all previously described.

If the change key 60 is not inserted into the ports 62, the combination is compared in decision 890 to the senior combination. If the senior combination matches, then the senior combination flag is toggled on/off in operation 892. This either enables the subordinate combination or disables the acceptance of the subordinate combination respectively.

When the combination does not match the senior combination in decision 890, the microprocessor checks to see if the senior flag is set ON in decision 894 and, if so, the combination is checked against the subordinate combination in decision 896. If either of the decisions 894 or 896 test false, then the flow from the respective decisions may be to the Lightning Error subroutine represented by operation 860, previously described.

When the combination matches the subordinate combination in operation 896, the flow is to block 868 which represents the Unlock.Flo subroutine of FIG. 16, which has been previously described. The flow from operations 868 or 860 could be to the Power Down subroutine represented by terminator 1200.

Dual Combination Change

Referring to FIG. 13, block 912 represents the subroutine illustrated in FIG. 15. Upon entry to the subroutine in FIG. 15 the new combination is acquired or read as the first of two combinations, in operation 1000. Then in operation 1002, the combination may be flashed back to the operator, permitting the operator to observe the new combination that has been entered. After the combination has been flashed back to the operator for a predetermined time, the logic control may flow to operation 1004 where the new combination, the second of two, is read. The new, second combination may be flashed back to the operator for verification in operation 1006. After the flashing ceases, as in operation 1002, the message "PO", standing for Pull may be displayed on the display 18 to inform the operator to pull the change key 60 from ports 62. At this point, in FIGS. 14 and 15 at operations 1058 and 1012 respectively, the change key symbol may be turned off and a message "CC" could be displayed to prompt the operator to confirm the combination(s) by entering the new combinations(s). Thence, the bolt 26 may be retracted and the new combination(s) may be stored in combination memory, completing the change of combination operation.

After the message "PO" may be displayed, operation 1010 may continue to sample the ports 62 to determine whether the change key 60 has been removed. The looping and sampling could continue until the key 60 is confirmed as removed, whereupon, in operation 1012, the write new combination flag is set and the flow may return to the flow in FIG. 17 at operation 914. With this understanding of the operation and control of the microprocessor, the operation of the microprocessor will be described with respect to the several security features.

Fast Entry Prevention

A dialer attacks a combination lock by dialing combinations until the lock opens. In order to open a lock in a short time period a dialer typically rotates the dial rapidly. Consequently, it is desirable to slow down the entry of lock combinations. By slowing the acceptable entry of a combination, it insures that the lock may statistically withstand such an assault for a longer time. If a dialer were devised to overcome some or all of the other safeguards and features of the lock, slowing the acceptable entry rate reduces the number of entries that may be attempted in a given period of time. Time is an enemy of the attacker, and exposes them to detection. Thus, anything that will delay the attackers success is useful.

Accordingly, the electronic lock 10 is provided with a timer within the microprocessor 44, which may wait a fixed time period, for example, two seconds after power-on, before entry of the first number of the combination. Additionally, this wait may be required after the entry of each subsequent number of the combination. Therefore, the total mandatory wait time could be eight seconds.

The internal clock timer of the microprocessor 44 may be started at power-on when the microprocessor 44 is supplied sufficient power from the power control 36 to operate the electronics 24. After the lock 10 has received power for the fixed time period the lock electronics 24 may then accept the entry of the first combination number. After the entry of each subsequent combination number there may also be a wait period. Thus, the lock 10 may not be entered in less than eight seconds and since, from a practical standpoint, it will take additional time to rotate the knob to the proper number, it is unlikely that the lock could be opened in less than 10 seconds by someone who know the proper combination. This feature reduces the effectiveness of an attack with a dialer.

Figure 20:
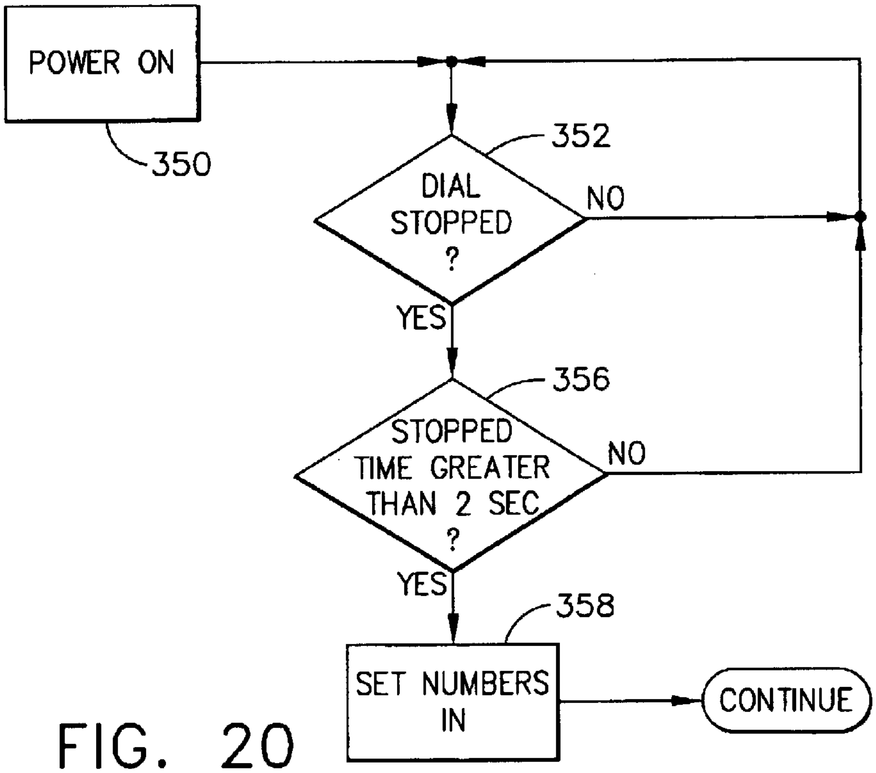
FIG. 20 is a logic flow diagram representing the logic control operations to detect the stopping of the knob and the timing of the stop, and if the stop time is sufficient to recognize the numbers displayed as a combination element.

If the combination is found to be correct, the lock may be opened or a change of combination effected, as previously discussed. The logic of the fast entry feature is shown in FIG. 20.

The prevention of entering a combination too rapidly acts to defeat the operation of a dialer. Accordingly, the selection of a minimum time, which must be exceeded in the entry of a combination, enhances the security of the lock 10.

Maximum Unattended Period Safeguard Feature

A common and serious security violation is to enter the first two numbers of a combination so that the third number may be entered at a later time with a minimum of delay in accessing the enclosure. This practice allows one who knows only the last number of a combination to access the enclosure.

Figure 18:
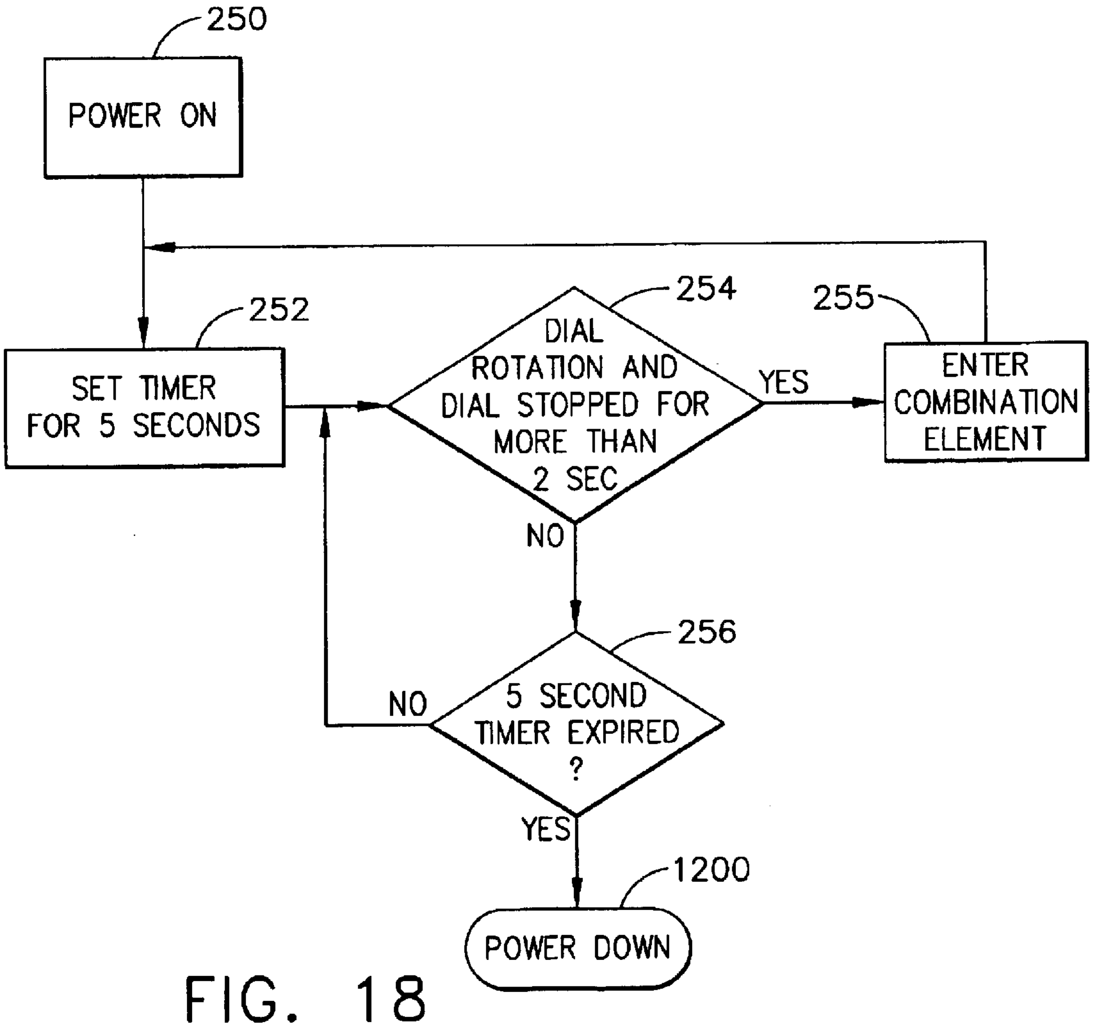
FIG. 18 shows a logic flow diagram representing the functional logic that prevents the lock from opening if the knob is left unturned for a pre-selected time without entry of the entire combination.

The electronic lock disclosed herein has a capability to defeat a partially entered combination and thus return the lock to a scrambled locked condition. FIG. 18 illustrates the function of this feature combined with the fast entry prevention feature of lock 10. The feature may start after the display of "E1", "E2", or "E3" as shown in FIGS. 5 and 6. Alternatively, this feature could start when the lock 10 is ready to accept the input of a combination element. Block 250 represents these prior actions. A timer is set to the period of time selected for this feature in operation 252. One time period may be five seconds. The microprocessor may check for knob 14 rotation followed by a stop in decision 254. If the knob 14 has rotated and then stopped for more than the number entry stop time allowed in the microcode, then the logic could permit the main program logic to enter the combination element in operation 255. Thereafter the logic loops back to just prior to operation 252 to reset the timer. When the knob 14 has not rotated, or has not be stopped for, the fixed time period, the flow of operations may be from decision 254 to decision 256 where the unattended timer is polled to see if the number entry stop time period may have expired. If it has expired, then the combination element has not been entered within the allotted time and the lock 10 could shut down with the Power Down subroutine represented by terminator 1200. This operation is on an interrupt basis and after the operation, the overall system operation continues unless the lock 10 has been shut down.

If the timer has not expired, the flow branches from decision 256 back to the main system operation as the interrupt is completed. Periodically, the main system flow is interrupted to check on the timer and knob status. This check is indicated by the loop back to decision 254.

This features effect is that if the knob 14 of the lock 10 is not tuned within 5 seconds the numbers of the combination already entered are ignored and are not effective to form part of the combination to unlock the lock. This prevents the operator from entering the first two numbers of the combination and waiting until significantly later to enter the third number of the combination to quickly open the lock 10.

Knob Rotation Limit

Figure 19:
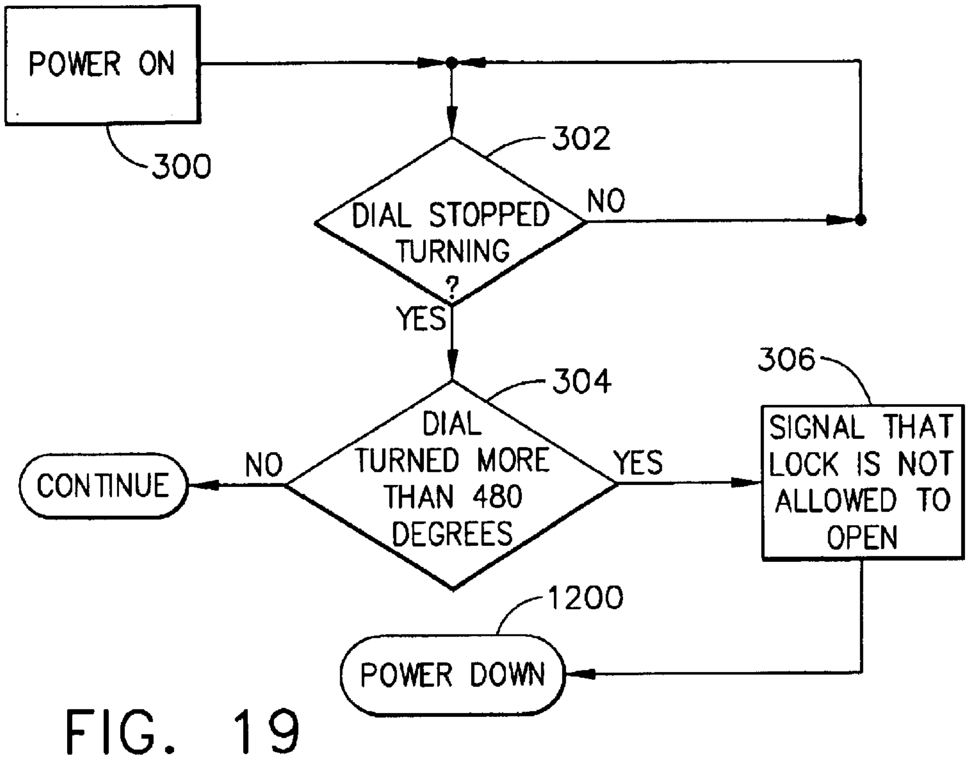
FIG. 19 is a logic flow diagram representing the logic control of the electronic lock to detect whether the knob of the lock has been turned more than 480 degrees without the knob stopping for a period of more than a predetermined amount.

The use of the human hand to rotate the knob 14 of the lock 10 results in the knob 14 being turned a partial turn and the knob 14 stopped and the hand repositioned to attain a new grasp of the knob 14 prior to the next turn. If the knob 14 turns more than what a normal hand/wrist will permit, the lock could be operated by a dialer or similar device. To sense this and to prevent the lock 10 from opening, the amount of knob rotation without a stop may be detected. This feature of the invention is illustrated in FIG. 19, which is a more detailed expansion of operation 414 of FIG. 16.

After power-on in operation 300, the signals from the sensor 34*a* are monitored and it is determined whether the knob 14 has stopped turning, in decision 302. If the determination of decision 302 is that the knob 14 has not stopped turning, then the logic control flow loops back to just prior to decision 302 and the signal output of the sensor 34*a* is again monitored. This loop continues until the knob 14 is detected as having stopped turning. When the knob 14 has stopped the logic flow branches out of the loop to decision 304 where the number of signals/pulses generated since the last knob stop is determined and compared with a fixed number of pulses. The fixed number of pulses could be the number of pulses sent by sensor 34 during rotation of the knob 14 by at least 1.33 turns or at least 480 degrees.

If the knob has rotated more than the predetermined amount without a stop of the knob the flow is directed to operation 306 where the lock electronics 18 are signaled to not open, even if the correct combination is entered. Operation 306 could be the Lightning Error subroutine, previously discussed. When the dial 14 has rotated less than the predetermined amount the program continues.

As described above, the operation of the lock 10 by a person may not be inhibited, while the operation of the lock 10 by a dialer or other similar device could be inhibited because the lock will not respond to the correct combination after the knob is rotated for more than the predetermined number of pulses from sensor 34*a* without stopping.

Variable Incrementation of the Display

To further inhibit utilization of a dialer, the lock 10 could be provided with a scheme of varying the number of pulses from knob position sensor 34 that are required to update the display 18 to cause it to display the next larger number. The benefit of this scheme is that as the speed of rotation of the knob 14 of the lock 10 increases, the rate of change of the displayed numerals increases until the rate of change is set by the fastest rotational rate and then the relationship of the rate of change of the displayed characters and/or numbers to the number of pulses from the knob position detector 31 remains constant for the remainder of that rotational movement of the knob 14, until the knob stops, even if the rotational speed of the knob slows during later stages of rotation this feature reduces the correlation of the number change rate on the display 18 and the extent of rotation of the knob 14.

Figure 21:
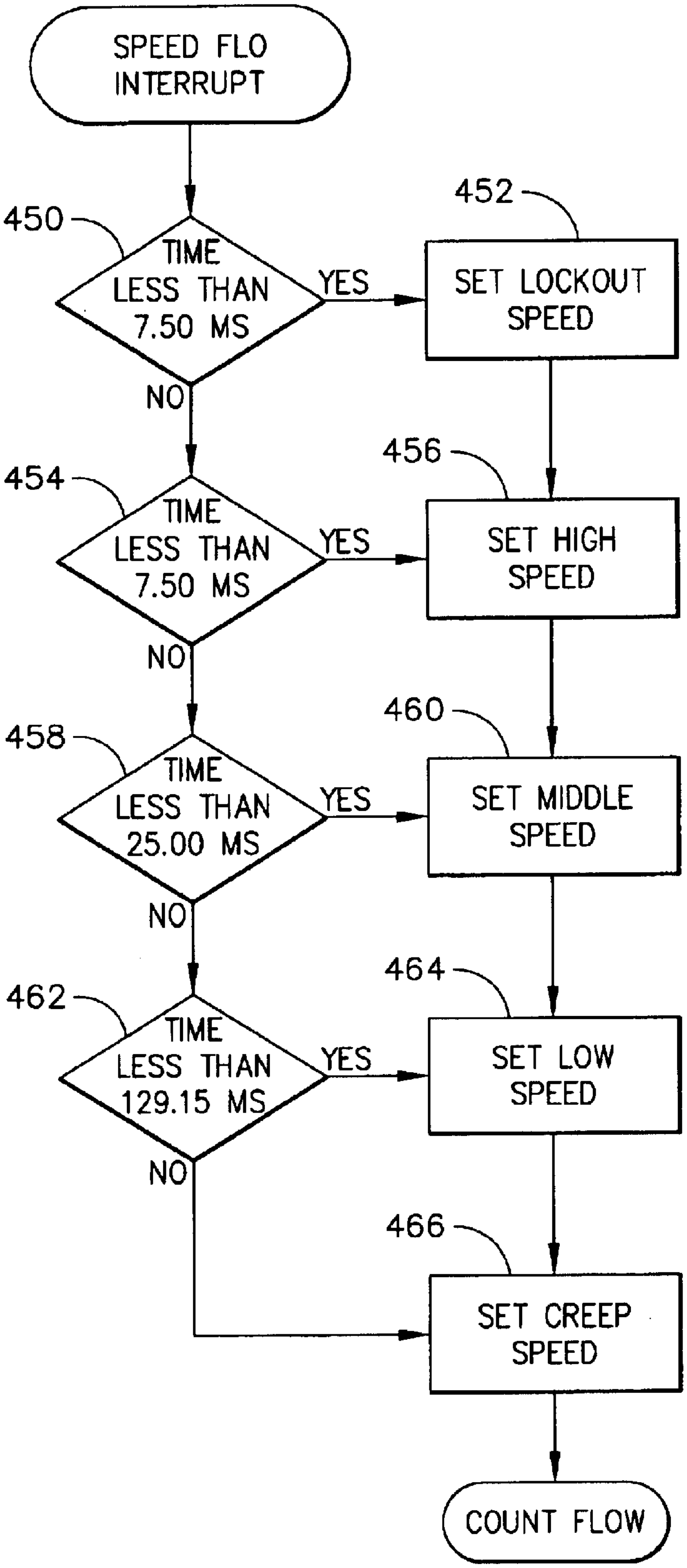
FIGS. 21 and 22 are logic flow diagrams that illustrates the logic control operations of the microprocessor to convert the speed of the knob rotation into a rate of incrementation of the displayed number.

FIG. 21 is a flow diagram which represents the decisions made by the microprocessor 44 on an interrupt basis to determine the speed at which the knob 14 is being turned, which then may be used to set rates at which the numbers are changed. Returning to FIG. 2, the knob position detector 31 outputs pulses on lines 38 and 40. The phase 1 line 38 conveys pulses, which are used to indicate rotational displacement of the knob 14. The knob position detector may be configured such that a full rotation of the knob 14 may cause the sensor 34*a* to send a number of signals/pulses. This number could be approximately 28 pulses. The number of pulses sent by the knob position detector 31, however, could vary depending on the indicator 32 and sensor 34 selected.

The pulses on the phase 1 line 38 may be connected to an interrupt bit in the microprocessor 44. Accordingly, each pulse may interrupt the microprocessor 44. The interrupt may be used to start and stop timers and counters.

As each speed criteria is met in ascending order of speed, that speed indicator may be set and retained for the remainder of the knob turn; while the speed indicator is not reduced if the knob slows down during that knob turn, the speed indicator may be increased as speed increases.

A further filter to eliminate spurious conditions which could lead to unreliable results is that the middle and high speed indicators in the microprocessor 44 could be locked out or rendered ineffective unless at least a predetermined number, for example 10, phase 1 pulses have been detected by the microprocessor 44 since the last valid knob stop. This filtering of the inputs insures that the middle and high-speed operation of the display 18 is prevented during quick short burst rotation of the knob 14.

The microprocessor 44 has within it a counter that could be designated as the combination counter, which counts the numbers and the numbers are displayed on display 18, as well as being available for the internal processing of the number and/or character for use in the combination. The combination counter may be incremented, based on the number of pulses received by the microprocessor 44. The number of pulses can vary based on the knob speed as decided by the voting scheme described above.

Exemplary conditions for changing the combination counter are presented tabularly below.

SPEED CHART

| SPEED FLAG | TIME INTERNAL BETWEEN PULSES MINIMUM | PULSES PER COMBINATION COUNT |
|---|---|---|
| Lock out | 7.5 msec | 1 |
| High | 7.50 msec | 1 |
| Middle | 25.00 msec | 2.5 |
| Low | 129.15 msec | 4–7 |

The lock out flag may set during the actual opening cycle of the lock 10 (turning the knob 14 to retract the bolt 26 from strike 56), to inhibit the bolt 26 from being retracted if the knob 14 is turned too fast. If the bolt 26 is engaged with the bolt retractor 50 when the knob is being turned too fast, physical damage, binding, or malfunction in the mechanical bolt retraction assembly may result.

The incrementing of the combination counter may be accomplished for the first four pulses of a turn in the low speed and then thereafter with each seven pulses. This scheme provides the operator a visual feedback early in the operation at these speeds and then slows the incrementing to the desired rate thereafter, for the same knob turn.

The counter and the display could be incremented by one unit for each 2.5 pulses if the interpulse time interval is less than 2.5 msec but more than 7.5 msec and the middle speed flag is set.

In the high-speed mode or operation, all numbers and/or characters may be sent to the display 18. Due to the response time of the display and the ability of the human eye to receive and process images only at relatively slow speeds, it may appear that numbers are being skipped by the display 18. Alternatively, in the high-speed mode not all numbers could be sent to display 18 resulting in skipped numbers but faster response.

For a better understanding of the logic operations necessary to control the speed of the change of the combination counter and display 18, reference is made to FIG. 21. The interpulse time period may be determined by the detection and voting scheme described above. Thus, the time value could be compared in decision 450 to the time interval standard for the lock out mode, i.e., 7.5 msec, and if the interpulse time is less than the standard, the lock out speed flag is set in operation 452. Following the setting of the lock out speed flag, the high speed flag may be set in operation 456. When the interpulse time standard for the high speed flag is longer than that selected for the high speed lock, then the high speed interpulse time would be checked in decision 454. If the measured interpulse time is less than that specified for the high speed flag in decision 454, then the high speed flag could be set :in operation 456.

If the time period is greater than the lock out or high speed mode time standard, then the flow is from decision 454 or 450 to decision 458 where the interpulse time period could be compared to the middle speed time standard. When the interpulse time is less than the middle speed setting, the flow branches to operation 460 where the middle speed flag is set. Similarly, the interpulse time period may be compared to the slow speed time standard and the appropriate speed flags set.

The setting of a speed flag results when the flow is diverted from the series of decisions 450, 454, 458, and 462. The flow is then through flag setting operations 452, 456, 460, and 464 as appropriate with the resulting setting of all flags for speeds slower that the first satisfied speed condition.

Referring to decision 462, if the interpulse time interval is greater than a preprogrammed time, for example, 129.15 msec, then the only remaining choice of speeds may be creep speed and the creep speed flag is set in operation 466. The flow from operation 466 could be back to the main flow of the program.

Figure 22:
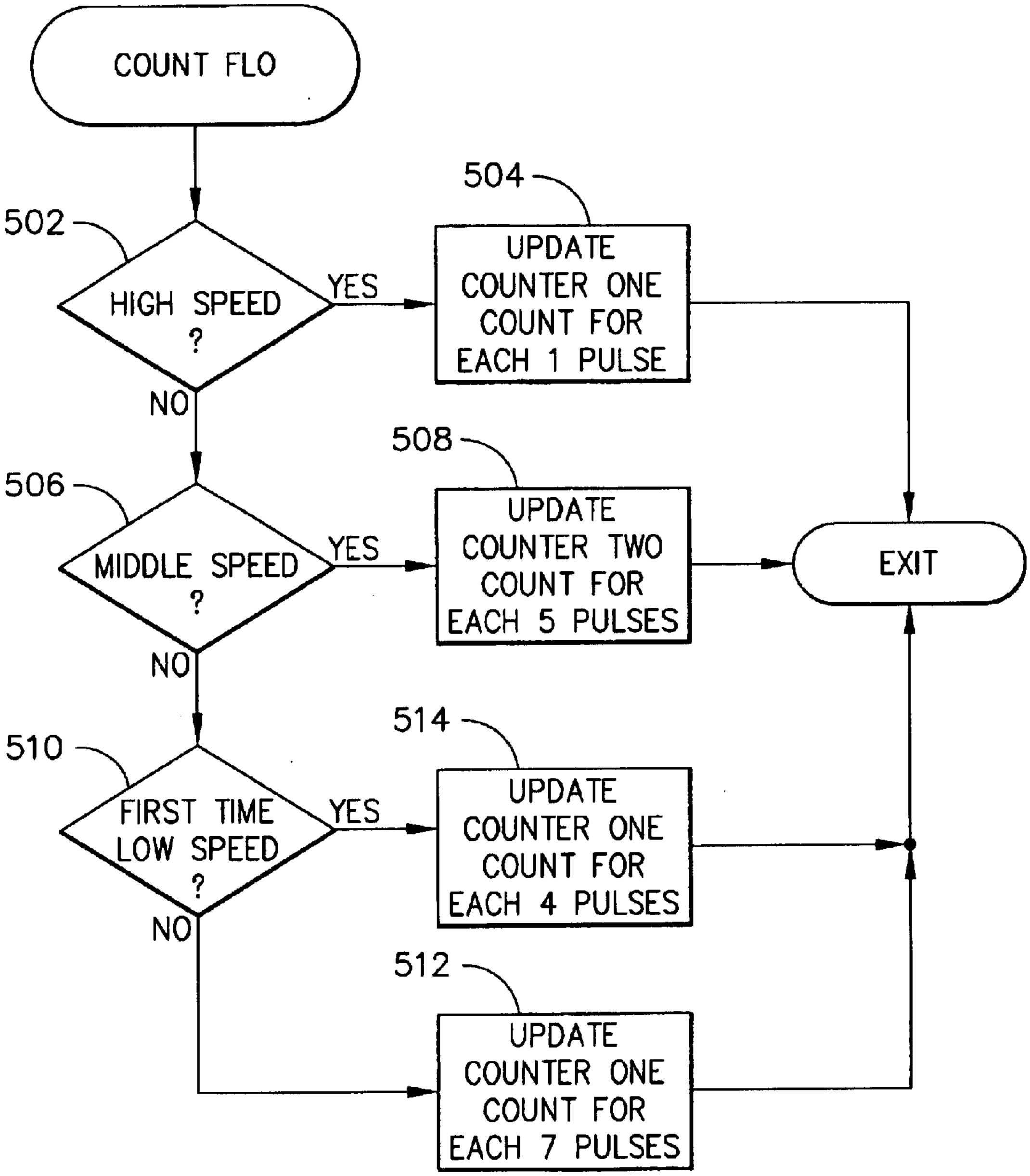

As the knob 14 is turned the microprocessor 44 not only receives the pulses but after determining the speed at which the knob 14 may be turning, then may update or increment the combination counter. This updating may be accomplished by the logic control operations represented by the flow diagram of FIG. 22 illustrating of the Count.Flo subroutine.

As the pulse flow into the microprocessor 44 continues, the flags of the microprocessor 44 may be checked to ascertain if the speed has been determined by the voting scheme as described above. The microprocessor 44 could check the high-speed flag in decision 502. If the high speed flag is set, the microprocessor 44 could update the combination counter by one unit for each pulse received from the knob position sensor 34*a*, as represented by operation 504. If the high-speed flag has not been set then the middle speed flag may be tested to see if it has been set in decision 506. When the middle speed flag has been set, as determined in decision 506, the combination counter could be updated by two units for each five pulses as represented by operation 508.

Similarly, if the flag for the middle speed is not set, a decision 510 may be made as to whether this could be the initial knob rotation at a low speed in this knob turn. If this decision operation results in a negative determination, then the knob 14 may have been rotated at a low speed previously in this knob turn and the combination counter may be incremented by one unit for each 'seven pulses sent by the knob position sensor 34, as represented by operation 512.

When the result of decision 510 is in the affirmative, the flow is to operation 514 where the combination counter could be updated by one unit for each four pulses received by the microprocessor 44.

Following the updating of the combination counter, in response to any of the speed flags set or not set the control may revert back to the main logic control of the lock 10.

Backup Feature

The backup feature is important in that it gives the operator a way to recover from an erroneously dialed number. The feature does not compromise the security of the lock since the operation of the lock is to back up the number by a fixed number of units upon any knob reversal, for example, four or ten units when entering a combination element. Thus, the backing up of the displayed numbers and/or characters on the display 18 does not indicate to the attacker that he has approached a combination since any reversal of the knob may result in backing up the same amount. While the generator is generating power the microprocessor 44 may not accept any input from the position detector 31.

Additionally, this feature may permit an operator to recall and reenter the previous combination element. This second back up feature may be utilized by reversing the rotation of knob 14 after entering a combination element and before rotating knob 14 to enter a subsequent combination element.

When entering the combination, the operator may turn the knob 14 too far and pass the target number of the combination. While the knob 14 may be turned additional revolutions and the target number selected and displayed, the lock may permit the operator to reverse the knob direction for a short displacement with the combination element displayed and contained in the combination counter changed by a predetermined amount. After the combination element backs up, the knob 14 may then be turned in the clockwise direction to again approach the target number and/or character of the combination. The logic control of this function uses two interrupt routines illustrated in FIGS. 23A and 23B.

Figure 23A:
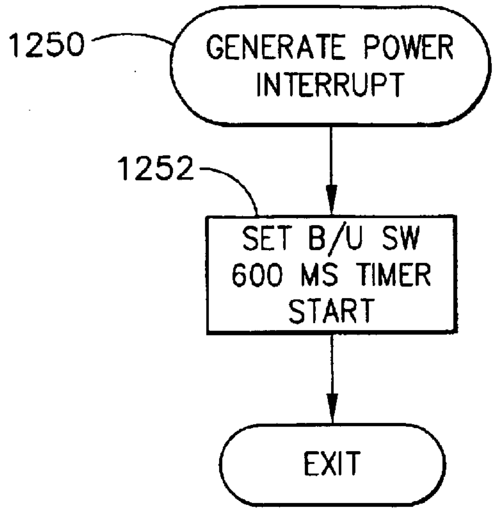
FIGS. 23A and 23B are logic flow diagrams that shows the logic control operations to permit the recovery from a condition where the number displayed is past the target number by less than or equal to 4 and allows the operator to reverse the display sequence and return to a number that is four units prior to the displayed number and to approach the target number again.

With reference now to FIG. 23A, the Generate Power is activated when the microprocessor 44 detects power generation by generator 29. The interrupt is represented by terminator 1250. This interrupt starts a timer in operation 1252. This timer may last at least 300 milliseconds to ensure that the operator really wants to back up. The timer can be set for approximately 600 milliseconds. The interrupt may also set a Back Up Switch or bit "ON" in operation 1252. Thereafter the interrupt will exit to the main program flow.

Figure 23B:
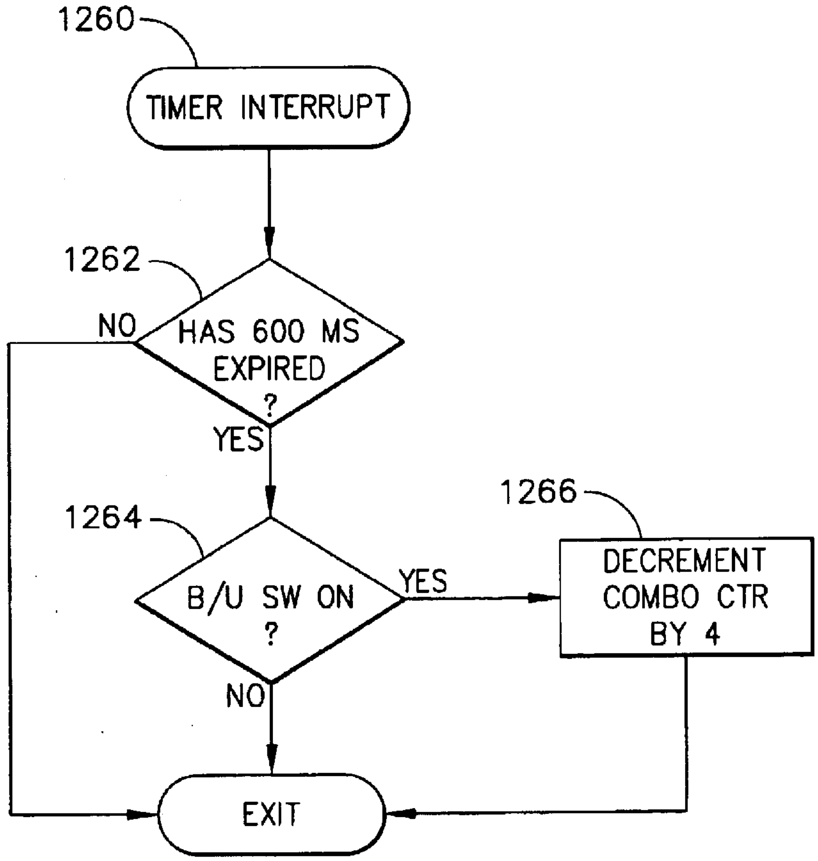

FIG. 23B illustrates the functional flow of the Timer Interrupt that decrements the combination counter and display by a fixed amount, for example, four or ten. Periodically the main program flow is interrupted to check the status of various timers. This interrupt is represented by terminator 1260. The interrupt checks the timer in decision 1262. If the timer is still running if a count down timer is used or has not reached end of the count the interrupt will exit and flow would return to the main program flow. When the timer has expired, the flow branches to decision 1264 where the microprocessor 44 checks the Back Up switch. If the Back Up switch is "OFF", then the interrupt would return the flow to the main program. When the Back Up switch is "ON", the combination counter and the display 18 are decremented by a fixed amount in operation 1266. Thereafter the interrupt would exit.

Knob Position Interrupt

Figure 24:
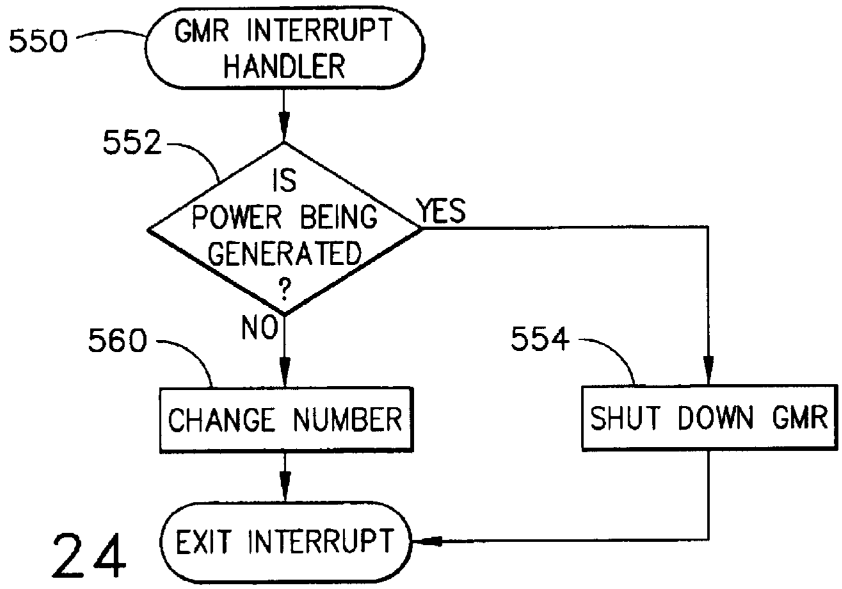
FIG. 24 is a functional diagram showing turning off the knob position sensor when power is generated.

In order to determine the position of knob 14, microprocessor 44 may be interrupted by; each signal/pulse transmitted by sensor 34*a*. Additionally, when generator 29 provides power to lock 10, sensors 34 may turn "OFF" to minimize power consumption and prevent erroneous lock operation. The GMR interrupt shown in FIG. 24 can perform these functions. Each time the sensor 31 a sends a signal to microprocessor 44 the main program flow can be interrupted. This interruption is represented by terminator 550. After the microprocessor 44 is interrupted the microprocessor 44 may check to see if generator 29 is producing power. Alternatively, microprocessor 44 could check the Back Up switch set by the Generate Power interrupt show in FIG. 23A.

If generator 29 is not providing power, then the numbers on display 18 and in the combination counter may be incremented by the Speed.Flo interrupt in operation 560. When generator 29 provides power to lock 10 during the interrupt the microprocessor 44 shuts down sensor 31*a*. Thereafter the interrupt exits and flow may return to the main program flow.

Error and Seal Counters

Referring back to FIG. 5, the operation of the audit and error counters and the display of their contents will be described. After providing power to lock 10, the microprocessor can check to see if the lock startup may be due to a power on entry in decision 816. The generation of power for more than a fixed time period, for example, 2.8 seconds, may be checked at decision 819. If power has been generated for less than the fixed time period, then the flow may branch back to decision 818. However, if power has been generated for more than the fixed time period, the flow could move to operation 820, which displays the audit counter contents on display 18. The audit counter may count the number of times that the lock has been opened successfully.

The contents of the audit counter can be displayed on the display 18, while power continues to be generated. When power generation ceases, as detected in operation 820, the error counter could be checked to ascertain if the value stored therein may be greater than or equal to a predetermined value, for example three, in operation 822. If the value in the error counter is greater than or equal to this value, then the error counter contents may be displayed in operation 824. The displayed number is the count of times that the lock 10 has been dialed for access without successfully opening it or when one of the security features has blocked the lock 10 from opening. The count is from the last successful opening of the lock 10.

The flow may move to the remaining program flow where the combination for the lock is allowed to be entered as discussed previously.

After entry of the combination, decisions 856 (FIG. 9), 876 (FIG. 10), or 890 and 896 (FIG. 11) compare the entered combination and the authorized combination and if they compare true, the lock is conditioned to unlock in operation 868.

Since the error counter only accumulates the count of erroneous entry attempts since the last successful opening of the lock 10, with the compare true on the combination, the error counter may be reset as in operation 970 (FIG. 17). Similarly, the audit counter counts successful combination entries, and the audit counter may be updated by incrementing its contents, also in operation 970.

Should the combination not compare true in decisions 856, 876, 890, and 896, the error counter is incremented in operation 860 to reflect the erroneous entry attempt. After the incrementing of the audit or error counters, the routine ends and the lock awaits any further input by the operator. As discussed earlier, if left unattended for a sufficient amount of time the lock will power down.

The combination of the error and audit counters provide a reliable, easily accessed, easily understood indication that the lock has been operated; and if the numbers are different, may indicate failure or success by the attacker.

Lost Combination Resetting

The serial number of the lock may be used as a temporary combination to open the lock and thus allow the setting of a new combination. This allows for circumstances where locks are placed in inventory and records of combinations are misplaced or memories lapse and no one remembers the combination of an inventory lock.

Figure 25:
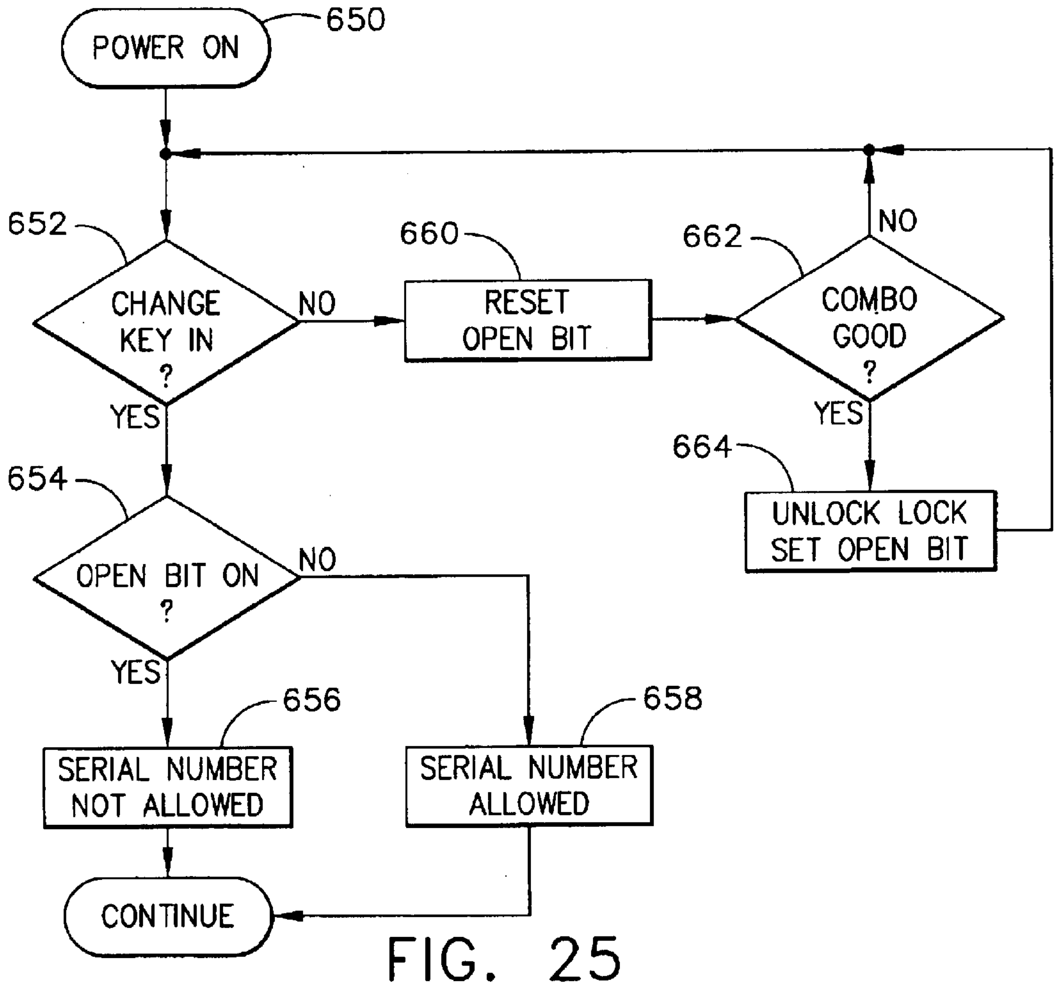
FIG. 25 is a logic flow diagram illustrating the feature where the serial number of a lock is used to operate the lock, under some circumstances.

Referring to FIG. 25, to open the lock so that the normal change combination procedure may then be used, the change key 60 is inserted in the lock 10. The lock 10, when powered on, operation 650, may detect the presence of the change key 60 in ports 62 of the microprocessor 44, in operation 652.

If the change key 60 is detected, the open flag in the memory of the microprocessor 44 is checked in operation 654. If the open flag is on, the serial number is not allowed by operation 656 as a combination, because the lock is open and was presumably opened with a correct and known combination. However, if the open flag or bit is not on, indicating that the lock 10 is locked, then the lock 10 is conditioned to accept the serial number of the lock 10 as a substitute combination, in operation 658. This may be accomplished by the setting of a flag which then allows the comparing of the serial number which is stored in a memory associated with microprocessor 44, with the entered combination, rather than comparing the authorized combination.

When the change key 60 is not in the lock 10, as ascertained in operation 652, the open bit may be reset in operation 660 and the combination entered is compared with the authorized combination in operation 622. If good, the lock is unlocked and the open bit is set in operation 664. If the combination is not good the logic flow branches back to the beginning of the routine to await further input.

This scheme does not compromise the security of the lock since the lock must be accessible for the insertion of the change key while the lock is locked, i.e., when the combination may be scrambled and the open bit is reset. This prevents the convert insertion of the change key 60 when a safe or vault is open and the return at a later time to open the safe or vault 12 with the combination that might be changed using the serial number of the lock.

The insertion of the change key 60 into the ports 62 creates a condition that prevents the resetting of the open bit. As seen from operations 654 and 658, the open bit must be reset for the serial number to be allowed in lieu of the authorized combination in the combination change procedure.

Covert Entry and Resset

If the bolt 26 of lock 10 is moved/opened without the lock being powered and an authorized combination entered, the lock 10 may be disabled from opening until entry of a covert entry (CE) reset combination or bypassing this feature. Additionally, if the bolt 26 of lock 10 is not withdrawn within a fixed period of time, for example, ten seconds, after the motor 46 has placed the lock in condition for bolt withdrawal, the lock may also be disabled. The reset combination can be a six-digit combination, however, the CE reset combination may have any desired length and may utilize numbers, characters and/or symbols.

Figure 26:
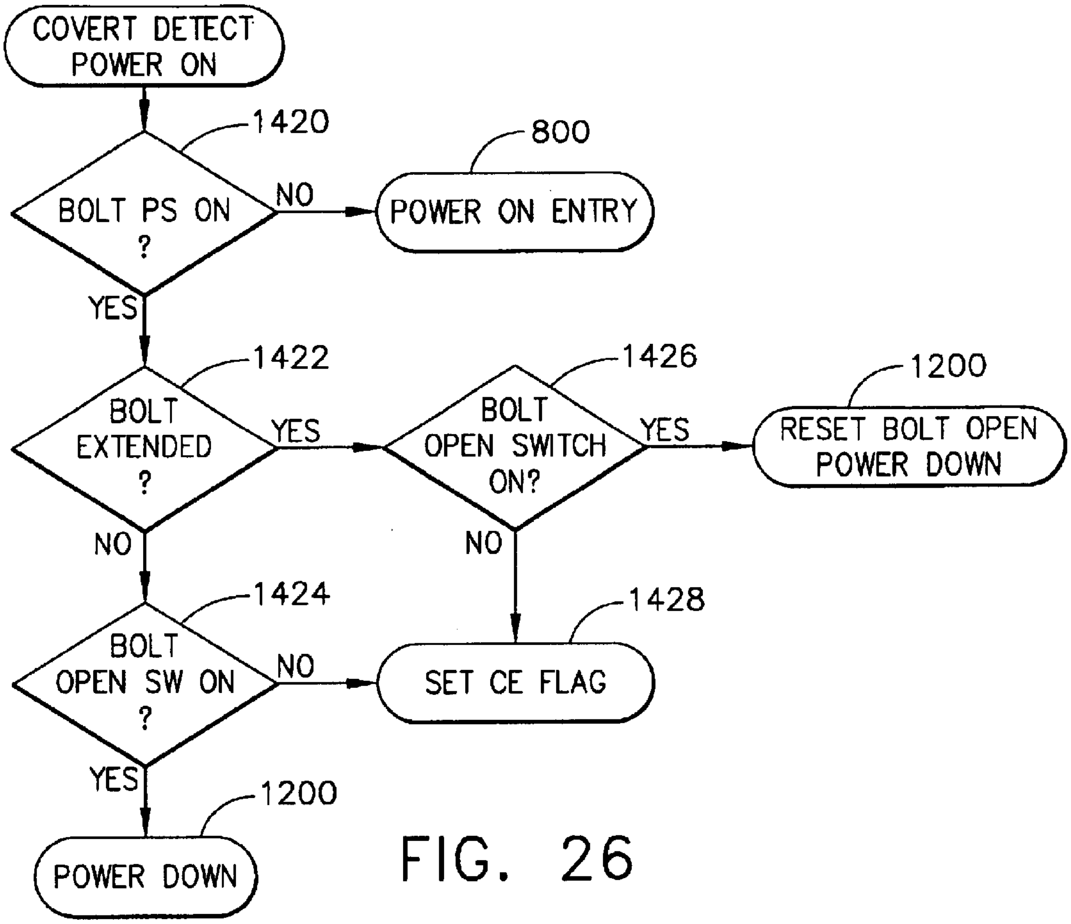
FIG. 26 is a logic flow diagram illustrating the logic and operations which enable the microprocessor to set a flag indicating that the lock security was compromised by an unauthorized bolt movement.

Referring now to FIG. 26 that illustrates one functional flow chart for setting the Covert Entry (CE) detect switch/flag. A second functional flow chart is provided in FIG. 27.

The covert detect power on the functional flow chart provided in FIG. 26 illustrates turning on the microprocessor 44 to set the CE flag "ON" if the bolt 26 is moved without entering the authorized combination. When microprocessor 44 turns on, the bolt power supply may be checked in decision 1420. If the bolt power supply is "OFF" a normal power on entry start up may be accomplished, as previously described.

When the bolt power supply is "ON", microprocessor 44 can be turned on due to the bolt movement. Therefore, the microprocessor 44 may check the status of bolt 26 in decision 1422. If the bolt is open, then the flow moves to decision 1424 where microprocessor 44 checks the bolt open switch. If the bolt open switch is "ON", then the lock 10 may power down. The bolt 26 open with the open switch "ON" is a normal condition and the microprocessor 44 is not required to take any action.

Similarly when the bolt is extended, the microprocessor 44 will also check the bolt open switch in decision 1426. If the bolt open switch is "ON", then the microprocessor may power down. The bolt extended and the bolt open switch "ON" is also a normal condition and microprocessor is not required to take any further action and the bolt open switch will be reset and the lock powered down.

In both of the conditions described above the position of the bolt matched the expected status of the bolt-open switch. However, when the bolt is open and the bolt open switch is "OFF" or the bolt is extended and the bolt open switch is "OFF", the microprocessor 44 may set the CE flag "ON" and shut down in terminator 1428.

Figure 27:
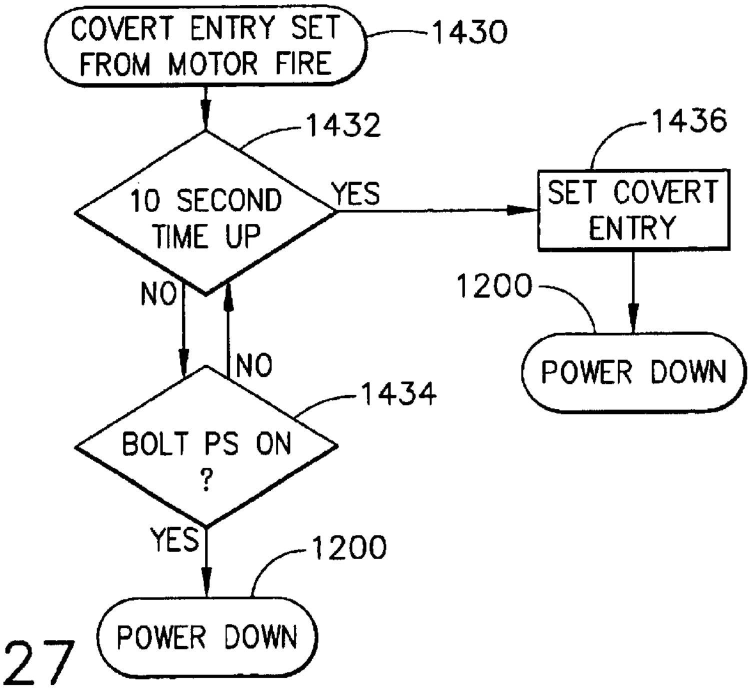
FIG. 27 is a flow diagram showing the microprocessor setting a flag indicating that the operator left the lock in an unsecure condition.

With reference now to the functional flow chart shown in FIG. 27 showing the setting of the CE flag if the bolt 26 is not withdrawn within a fixed time of firing motor 46. Normal operation of lock 10 including firing motor 46 and starting a timer is represented by terminator 1430. After firing motor 46 the program flow may loop between checking the timer in decision 1432 and checking the condition of bolt 26 in decision 1434. If the bolt 26 is opened before the timer expires, for example, 10 seconds, the lock 10 may power down. When the timer expires before the bolt is withdrawn, the lock 10 may be in an unsecured condition since anyone can now withdraw the bolt 26 by rotating knob 14. Therefore, in order to indicate this unsecured condition the microprocessor sets the CE flag to "ON" in operation 1436. Thereafter the lock 10 could power down.

Figure 28:
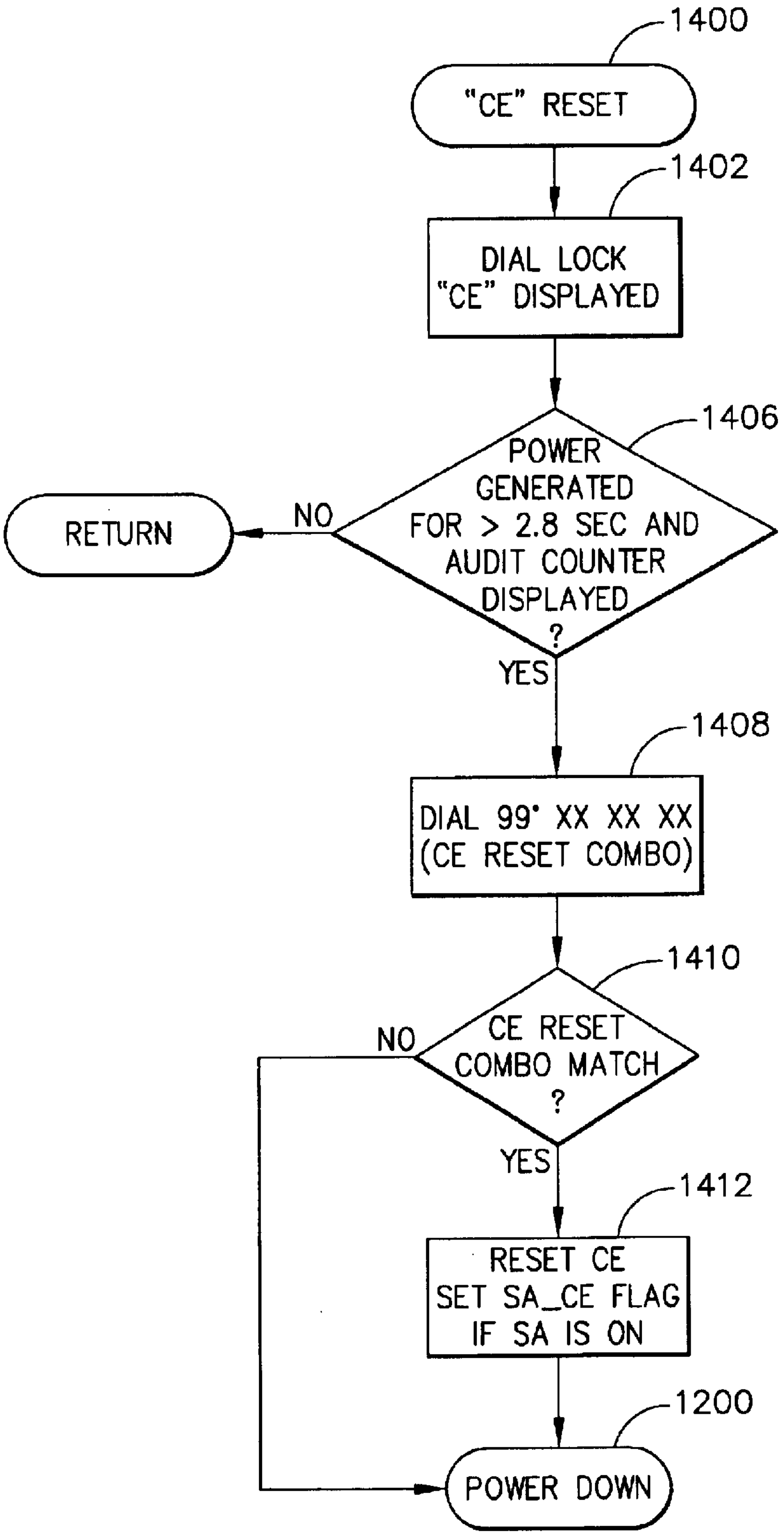
FIG. 28 illustrates the functional logic used to reset the flag use to indicate that an unauthorized access to the container secured by the lock may have occurred.

Referring to FIG. 28, when the lock 10 is powered by the rotation of generator 29 as represented by terminator 1400, and "CE" is displayed on display 18, represented by block 1402 lock 10 may be reset before opening lock 10 or the CE lock out feature bypassed. The microprocessor 44 checks to see if the lock 10 was powered a minimal time, for example, greater than 2.8 seconds as shown in operation 1406. If the lock 10 was not powered for this minimum time then the lock 10 may permit a combination to be entered. This entry however, may not open the lock 10. When the lock 10 has been powered for the minimum time the error and audit counters may be displayed as discussed above. Then the operator can enter one or more numbers, characters and/or symbols, typically "99", and the "CE" reset combination as shown in block 1408. The number, "99" in this case, may serve as a trigger that a reset combination is being entered. When the reset combination is entered, the lock 10 will check the "CE" reset combination for a match in operation 1410. When there is a match then the "CE" detect flag is reset and the SA-CE switch is set "ON" if the SA detect flag is "ON" in block 1412. If the combinations do not match the operator must start the reset process from the beginning.

Surreptious Attempt Reset

If an operator enters a set number, for example, 15, of consecutive incorrect combinations the lock 10 may be disabled until the entry of a CE reset combination. The reset combination typically is a six digit combination, however, the reset combination may have any length desired and may utilize numbers, characters and/or symbols.

Figure 29:
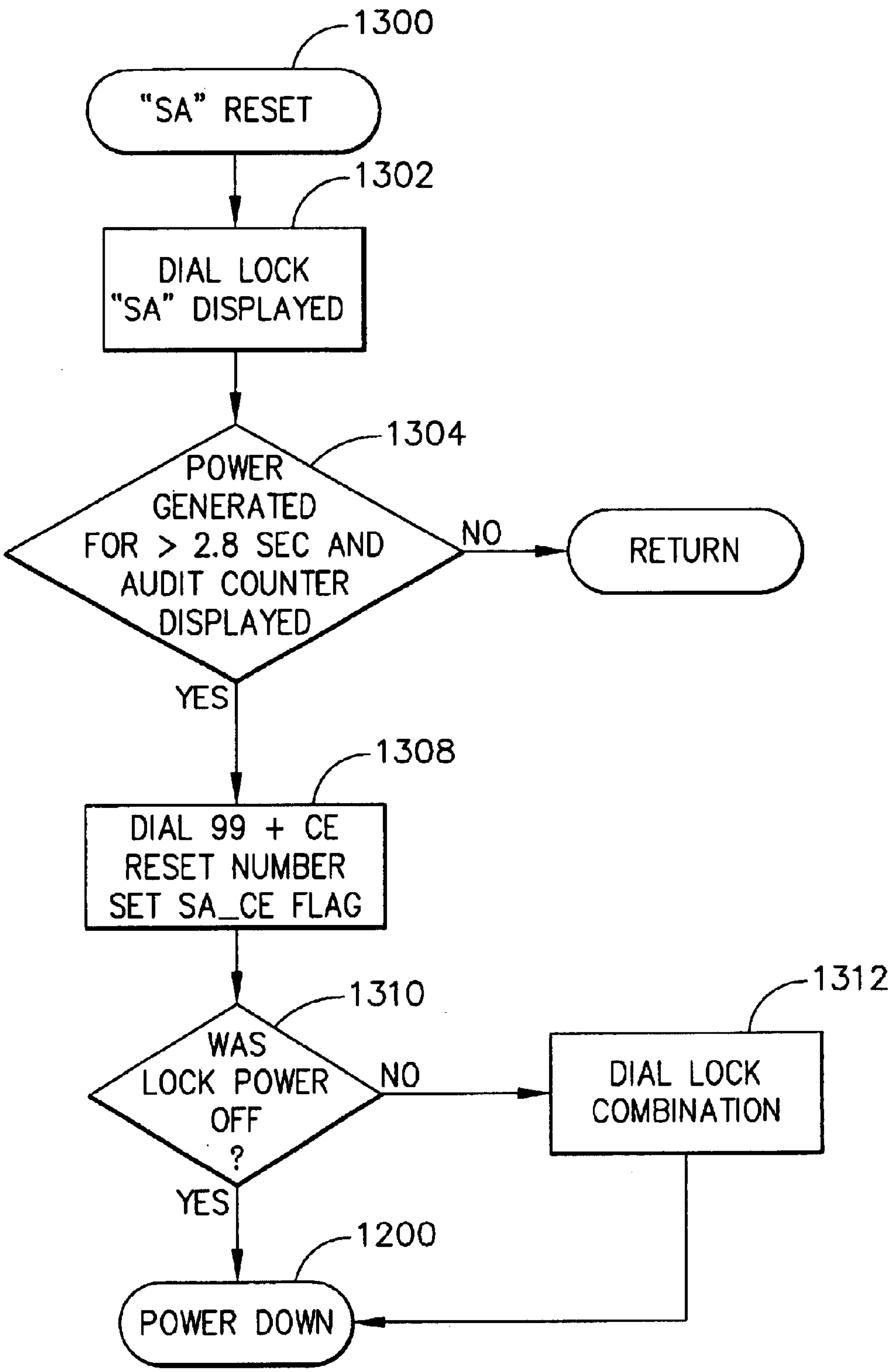
FIG. 29 is a functional flow chart of the logic used to reset the lock after the erroneous attempts have exceeded the predetermined number of FIG. 12.

Referring to FIG. 29, when the lock 10 is powered by the rotation or generator 29 as represented by terminator 1300, and "SA" is displayed on display 18, represented by block 1302 lock 10 may be reset in order to employ the authorized combination to open lock 10. The microprocessor 44 could check to see if the lock was powered a minimal time, for example, greater than 2.8 seconds, as shown in decision 1304. If the lock was not powered for this minimum time then the lock may permit a combination to be entered. This entry, however, may not open the lock 10.

When the lock 10 has been powered for the minimum time the error and audit counters may be displayed as discussed above. Then the operator can enter one or more numbers, characters and/or symbols, typically "99", followed by the "CE" reset combination as shown in block 1308 followed by the authorized combination in block 1312. The microprocessor may check to ensure that both combinations were entered in the same power cycle in operation 1310. If the lock turns off then the proceeding steps may be repeated when the lock 10 again is powered. When both the reset combination and the authorized combination were entered without the lock 10 turning off, the lock 10 will check the combinations for a match also in operation 1312. When there is a match then the "SA" detect flag can be reset in operation 410 of FIG. 16. If the combinations do not match, the operator may start the reset process from the beginning.

The foregoing routines that implement the functions and features operate within the system operations of the lock as is represented in FIG. 5 and the Figures referred to from FIG. 5.

The exemplary embodiment of this invention implements the control operations and hence the functions and operational features of the lock 10 in microcode in a microprocessor 44 of the type sold by OKI Electric Industries Company, Ltd., under the designation 80C5IF. Other microprocessors by other manufactures may be substituted for the preferred device so long as the characteristics of the substituted device meet the needs of the lock 10.

The control of the microprocessor 44 is by microcode which is written according to the constraints defined by the device manufacturer and which are readily available from the device manufacturer of choice. Any skilled code writer may code the microcode, given a program listing. The program listing may be prepared for the device of choice, following the constraints required by the particular microprocessor device chosen. The logic and operational flow diagrams contained in FIGS. 5–29 are applicable to any microprocessor and accordingly, teach one of skill in programming the necessary operations to operate the lock. The organization of the logic flows is exemplary and may be modified according to the desire of the programmer and code writer.

The foregoing is an exemplary embodiment of the invention. It is recognized that changes and modifications may be made to the embodiment of the invention without departing from the scope and the spirit of the invention and such changes and modifications reside within the scope of the claims below.

We claim:

1. An electronic combination lock comprising:

a knob;

a knob rotation detector, said detector senses rotation of said knob;

a bolt;

a display; and an electronic circuit, said circuit receives a knob rotation signal from said knob rotation detector, said circuit converts said knob rotation signal into a display number, said circuit stores said display number as a combination number in memory, upon receiving a signal indicating reversal of said knob before said knob rotates to select a subsequent combination number said circuit recalls said combination number from said memory and updates said display with said combination number, said circuit updates said display number as said knob rotates until said combination number is stored, said circuit combines one or more combination numbers into an entered combination, said circuit compares said entered combination with an authorized combination, upon said entered combination comparing equal to said authorized combination said circuit enables said bolt to be withdrawn and said lockopened.

2. A method for preventing unauthorized opening of an electronic combination lock, said method comprising:

entering a combination;

comparing said entered combination with an authorized combination;

upon said entered combination comparing equal to said authorized combination, resetting an error counter;

upon said entered combination failing to compare equal to said authorized combination, incrementing said error counter; and upon said error counter reaching a predetermined number, preventing said lock from opening until a reset combination is entered that resets the error counter.

3. A method for decorrelating knob position from the number displayed when entering a combination into an electronic lock, said method comprising:

conditioning said lock to accept entry of said combination;

rotating said knob; and delaying incrementing said number displayed for a random time period.

4. A method for correcting a combination entered into an electronic lock; said method comprising:

rotating a knob until a desired number is indicated on a display;

entering said desired number as part of said combination;

before entering a next number of said combination, reversing rotation of said knob and recalling said entered number to said display; and rotating said knob until a correct number is indicated on said display.

5. An electronic combination lock comprising:

a knob;

a knob rotation detector, said detector senses rotation of said knob;

a bolt;

an electronic control circuit, said circuit receives a knob rotation signal from said knob rotation detector, said circuit converts said knob rotation signal into an entered combination, said circuit compares said entered combination and an authorized combination, when said entered combination compares equal to said authorized combination said circuit resets an error counter and enables said bolt to be withdrawn and said lock opened, upon a failure of said entered combination comparing equal to said authorized combination said circuit increments said error counter, when said error counter reaches a predetermined number said circuit prevents said lock from opening until a reset combination is entered that resets said error counter.

6. An electronic combination lock comprising:

a knob;

a knob rotation detector, said detector senses rotation of said knob;

a bolt;

a display;

an electronic control circuit, said circuit receives a knob rotation signal from said knob rotation detector, said circuit imposes a random time period delay between said dial beginning rotation and updating said display with a combination number, said electronic circuit converts said knob rotation signal into an entered combination, said circuit compares said entered combination with said authorized combination, when said entered combination compares equal to said authorized combination said circuit enables said bolt to be withdrawn and said lock opened.

* * * * *